(12) United States Patent
Hayashi

(10) Patent No.: US 8,103,126 B2
(45) Date of Patent: Jan. 24, 2012

(54) INFORMATION PRESENTATION APPARATUS, INFORMATION PRESENTATION METHOD, IMAGING APPARATUS, AND COMPUTER PROGRAM

(75) Inventor: Shunsuke Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 12/412,980

(22) Filed: Mar. 27, 2009

(65) Prior Publication Data

US 2009/0278948 A1 Nov. 12, 2009

(30) Foreign Application Priority Data

May 7, 2008 (JP) ................................. 2008-121668

(51) Int. Cl.
*G06K 9/36* (2006.01)
(52) U.S. Cl. ........ 382/285; 382/154; 382/291; 382/274; 348/218.1
(58) Field of Classification Search .................. 382/154, 382/285, 276, 277, 278, 280, 281, 274, 291; 348/218.1, 578, 579, 580; 345/419, 420, 345/421, 422, 423, 424, 425, 426, 427; 463/30
See application file for complete search history.

(56) References Cited

U.S. PATENT DOCUMENTS

| 2003/0085895 | A1* | 5/2003 | Oka | 345/426 |
| 2004/0234123 | A1* | 11/2004 | Shirai et al. | 382/154 |
| 2005/0068314 | A1* | 3/2005 | Aso et al. | 345/419 |
| 2005/0213808 | A1* | 9/2005 | Ohtomo et al. | 382/154 |
| 2006/0056726 | A1* | 3/2006 | Fujiwara et al. | 382/276 |
| 2009/0080803 | A1* | 3/2009 | Hara et al. | 382/285 |

FOREIGN PATENT DOCUMENTS

| JP | 11-211993 | 8/1999 |
| JP | 2003-216977 | 7/2003 |
| JP | 2005-289264 | 10/2005 |
| JP | 2007-26200 | 2/2007 |
| JP | 2007-272511 | 10/2007 |
| JP | 2008-17223 | 1/2008 |

* cited by examiner

*Primary Examiner* — Samir Ahmed
*Assistant Examiner* — Ali Bayat
(74) *Attorney, Agent, or Firm* — Oblon, Spivak, McClelland, Maier & Neustadt, L.L.P.

(57) ABSTRACT

A method of presenting information, capable of displaying an image including one or more objects being in the vicinity of the ground, the method including the steps of: acquiring viewpoint information; acquiring visual line information; acquiring posture information; acquiring additional information related to the object position information; calculating horizon line information in the image; determining a reference line on the image on the basis of the horizon line information and the posture information; calculating distance information from the viewpoint position to the object; determining a display attribute of the additional information including a display mode of the additional information and a display position of the additional information in the image with respect to the reference line; and presenting the additional information on the basis of the display mode so as to reveal a relationship between the additional information and the object when displaying the image on the display unit.

4 Claims, 17 Drawing Sheets

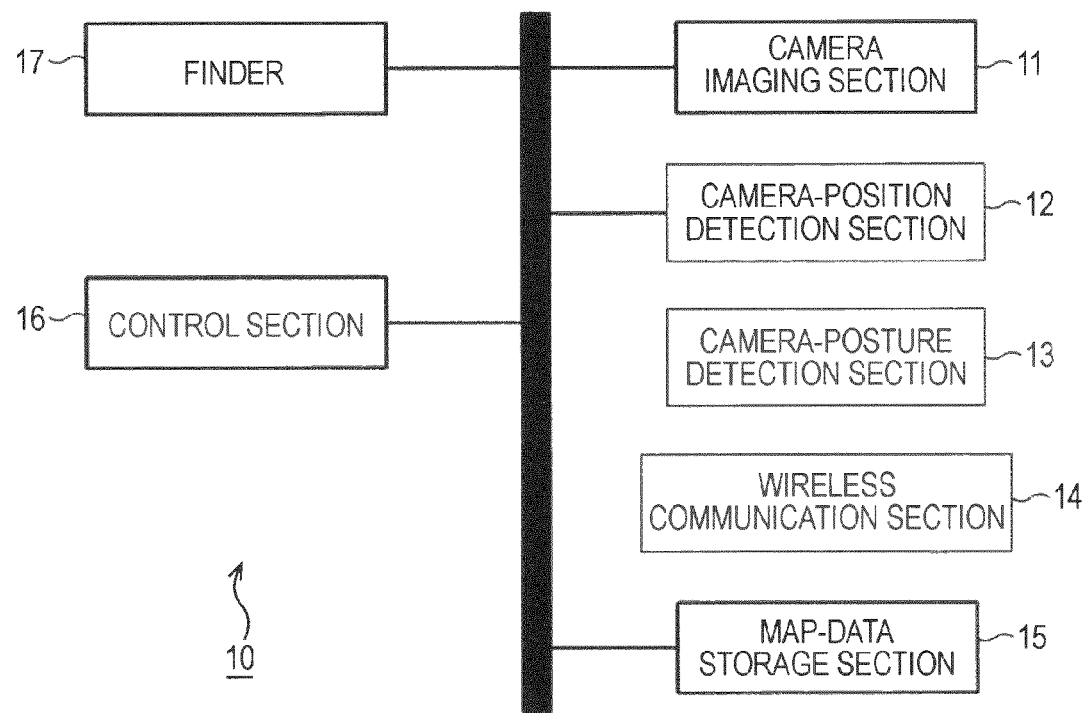
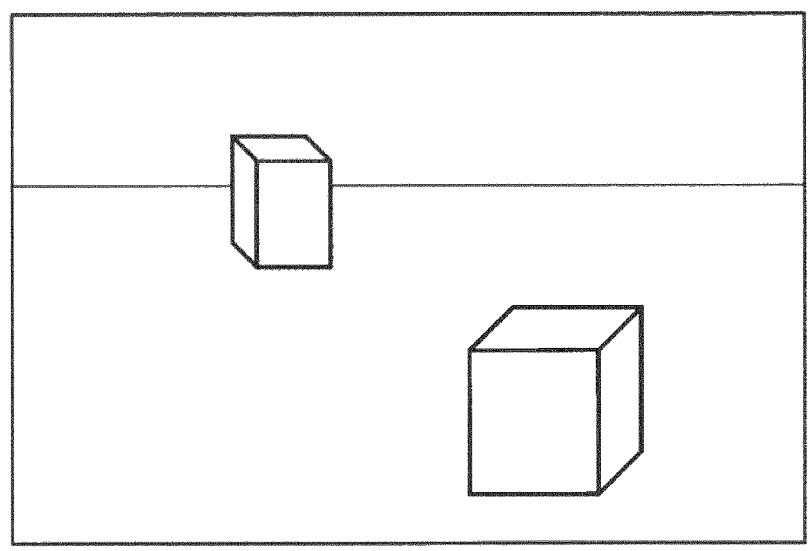

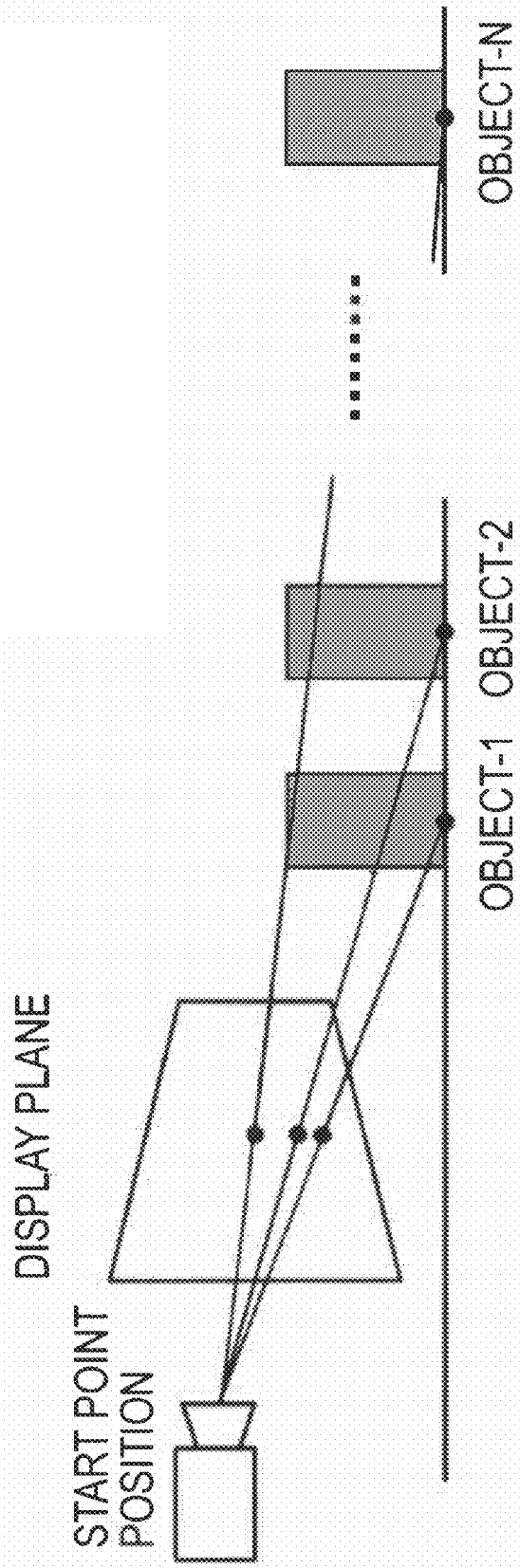

FIG. 9A
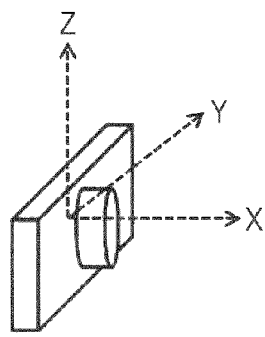 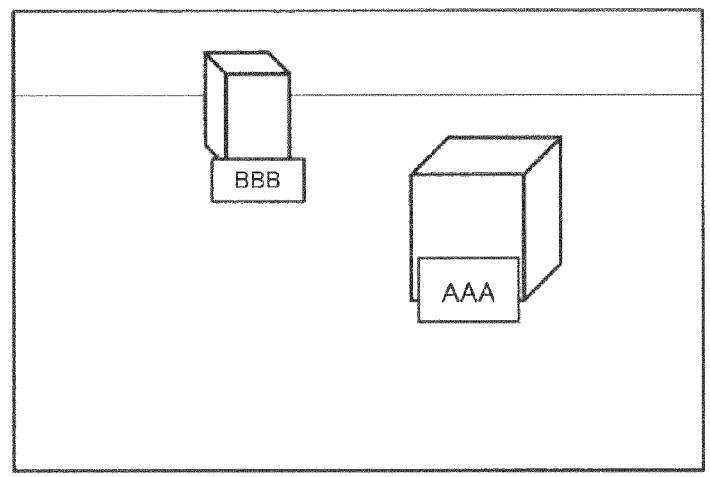
FIG. 9B
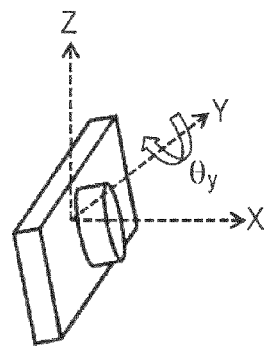 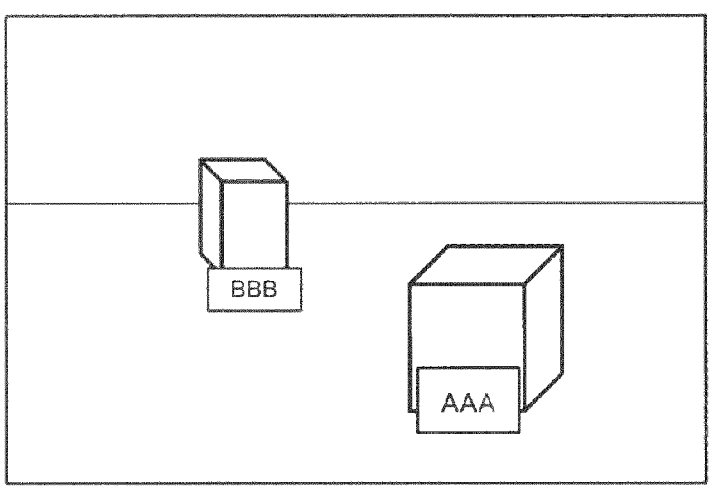

INFORMATION PRESENTATION APPARATUS, INFORMATION PRESENTATION METHOD, IMAGING APPARATUS, AND COMPUTER PROGRAM

BACKGROUND OF THE INVENTION

1. Field of the Invention

The present invention relates to an information presentation apparatus, an information presentation method, an imaging apparatus, and a computer program which process image information captured, for example, by a digital video camera and a digital still camera. In particular, the present invention relates to an information presentation apparatus, an information presentation method, an imaging apparatus, and a computer program, which superimpose additional information on a captured image or a through-the-lens image.

More particularly, the present invention relates to an information presentation apparatus, an information presentation method, an imaging apparatus, and a computer program which present information, such as names of buildings and the surrounding spots contained in a captured image or a through-the-lens image. In particular, the present invention relates to an information presentation apparatus, an information presentation method, an imaging apparatus, and a computer program which present information, such as names of buildings and the surrounding spots contained in a captured image or a through-the-lens image for a user to easily and intuitively understand a sense of distance to a subject.

2. Description of the Related Art

Recently, digital cameras (including still cameras and video cameras) which digitize images captured by a solid-state imaging device, such as a CCD (Charge Coupled Device), a CMOS (Complementary Metal-Oxide Semiconductor), etc., have become widespread. By a digital camera, an image digitized and coded can be stored in a memory, and can be subjected to image processing and image management by a computer. Also, a digitized image has an advantage in that there is no problem as to a lifetime of a medium compared with a photograph taken by a silver-film camera using a related-art film or a photosensitive plate.

Many digital cameras are provided with a view finder having a relatively large screen, and can use the view finder for displaying a through-the-lens image and a menu screen, and can reproduce and output recorded images. Also, in the same manner as the other mobile devices, a digital camera has a processing ability of digital information, and thus can present various kinds of beneficial information to a user on the basis of data obtained by detection of output from an internal sensor or through an external interface.

For example, if information, such as names of buildings and the surrounding spots, is superimposed on a scenery image displayed on a finder as a captured image or a subject, it becomes possible to implement a function of navigation, and thus it is convenient. Recently, some product models of camera include a position sensor, such as a GPS (Global Positioning System), etc. Thus, it is possible for the camera to obtain necessary information in order to superimpose the surrounding spot information, such as a shooting position, shooting direction, an object position, and object information, etc.

For example, a proposal has been made of an information display apparatus enabling to see a name of the object in the vicinity of an object observed through a lens (for example, refer to Japanese Unexamined Patent Application Publication No. 11-211993).

Also, building data of each building included in a captured real image is obtained on the basis of a three-dimensional position of a camera. A proposal has been made of an information presentation apparatus for providing a real image showing a target building in an easily understandable manner by projecting an object to be enhanced and the other surrounding buildings with being overlapped in a display frame, eliminating hidden surfaces, and applying, on the real image, an enhancement filter increasing the brightness on pixels in an enhanced portion. (For example, refer to Japanese Unexamined Patent Application Publication No. 2003-216977)

However, if a plurality of pieces of information is overlaid on a finder image, a character string may be overlapped, an object lies behind another front object, and thus it becomes difficult to see. Also, even if there is only one object (subject) to be presented, it is difficult to immediately understand a distance to the object, etc., from a current shooting position by viewing the captured image or the through-the-lens image, and thus a sense of distance obtained from the image is not intuitive.

SUMMARY OF THE INVENTION

It is desirable to provide an excellent information presentation apparatus, information presentation method, imaging apparatus, and computer program which are capable of preferably superimposing additional information on a shot image or a through-the-lens image captured by, for example, a digital video camera and a digital still camera.

It is also desirable to provide an excellent information presentation apparatus, information presentation method, imaging apparatus, and computer program which are capable of preferably presenting information, such as names of buildings and the surrounding spots contained in a captured image or a through-the-lens image.

It is further desirable to provide an excellent information presentation apparatus, information presentation method, imaging apparatus, and computer program which present information, such as names of buildings and the surrounding spots contained in a captured image or a through-the-lens image in order to allow a user to easily and intuitively understand a sense of distance to a subject.

The present invention has been made in view of the above-described problems. According to an embodiment of the present invention, there is provided an information presenting apparatus including: an image acquisition section obtaining an image captured by a camera imaging section capable of shooting one or more objects being in the vicinity of the ground; a display section capable of displaying the captured image; a viewpoint information acquisition section obtaining viewpoint information on a viewpoint position of when the camera imaging section shoots the object; a visual line information acquisition section obtaining visual line information on a visual line direction of when the camera imaging section shoots the object; a posture information acquisition section obtaining posture information of when the camera imaging section shoots the object; additional information acquisition means for obtaining additional information of the object in connection with position information of the object; reference-line determination means for calculating horizon line information in the captured image from the visual line information and the posture information, and determining a reference line to be used for displaying the additional information in the captured image on the basis of the horizon line information; distance information calculating means for calculating distance information from the viewpoint position to the object on the basis of the position information and the viewpoint information, display-attribute determination mean for determining a display attribute including a display mode of the additional information in the captured image and a display position of the additional information in the captured image with respect to the reference line; and additional-information presenting means presenting the additional information on the captured image on the basis of the display attribute. Note that the reference-line determination means determines a reference line using both visual line information and position information, or either the visual line information or the position information (in the application concerned, "A or B" in each claim is basically defined to mean both "A and B", and "either A or B").

For example, for a scenery image being displayed in a finder with one or more objects of shooting, such as buildings, the surrounding spots, etc., if additional information, such as names of the buildings and the surrounding spots, is superimposed, it is possible to achieve a function of navigation, etc.

However, if a plurality of pieces of additional information is overlaid on a finder image, a character string may be overlapped, an object lies behind another front object, and thus it becomes difficult to see. Also, even if there is only one object to be presented, it is difficult to immediately understand a distance to the object, etc., from a viewpoint position of the shooting of the camera by viewing the captured image and the through-the-lens image, and a sense of distance obtained from the image is not intuitive.

In contrast, in the information presentation apparatus according to an embodiment of the present invention, when additional information related to an object captured as a subject on a through-the-lens image is presented by being superimposed, a display position of the additional information on the screen and display attributes, such as a display mode (a size of characters, etc.) are determined on the basis of distance information from the viewpoint position of the camera to the object, visual line information and posture information of the camera at shooting time. Accordingly, it becomes easy for the user to intuitively understand a sense of distance to an object of shooting on the basis of the display attributes of the additional information on the buildings and the surrounding spots.

When viewing an object on the ground from a viewpoint position disposed above the ground, an eye line is normally from the above, that is to say, downward. The farther an object is from the viewpoint position, the nearer to a horizon line the visual line direction becomes, and thus the higher the observation point corresponding to the object on a through-the-lens image becomes. That is to say, the nearer an object is from the viewpoint position, the lower the object is viewed on the screen. And, the farther an object is, the higher the object is viewed.

If a visual line direction of a camera is horizontal, the horizon line position becomes a line passing through the vicinity of a center of a through-the-lens image. Also, the horizon line position can be determined by a geometrical calculation, etc., on the basis of the visual line information on a visual line direction at the time of shooting an object by a camera and posture information on a posture at the time of shooting an object by the camera. Thus, in the information presentation apparatus according to an embodiment of the present invention, a horizon line on the through-the-lens image is calculated, and a reference line position on the through-the-lens image is determined on the basis of this horizon line. Next, the display position of additional information with respect to the reference line on the through-the-lens image is determined in accordance with distance information from the viewpoint position of the camera to the object. For example, if the visual line of the camera is a substantially horizontal direction, additional information is disposed such that the nearer an object is from the viewpoint position at the time of shooting an object by the camera, the lower the additional information is disposed on the screen of the through-the-lens image, and the farther an object is, the nearer to the reference line of the through-the-lens image, the additional information is disposed. This is just like dispositions when a person views a plurality of objects placed on the ground at various distances away, and thus it becomes easy for the user to intuitively understand a distance of an object to which additional information is related.

Also, if a posture (that is to say, at least one of a roll angle, a pitch angle, and a yaw angle) of a camera imaging section shooting an object changes, a reference line position in the target shooting area or the through-the-lens image changes, and thus the display position of the additional information changes along with this change. Thus, every time the information presentation apparatus has detected a change in posture, the information presentation apparatus obtains the viewpoint position information, the visual line information and the posture information of the camera again, then recalculates the horizon line position on the through-the-lens image, determines the reference line again, and updates the display position of the additional information.

Also, in the information presentation apparatus according to an embodiment of the present invention, the display mode of the additional information is changed in accordance with a distance between the viewpoint position of the camera shooting an object and the position information of the object. Specifically, the character font size included in the additional information is changed as the distance becomes longer. That is to say, the nearer the object is from the viewpoint position of the camera, the larger the character of the additional information is displayed, and the farther the object is, the smaller the character is displayed.

In this manner, the superimposing position and size of the character of the additional information related to an object included in the through-the-lens image are determined on the basis of the positional relationship of whether an object is near or far from the viewpoint position of the camera shooting the object. Accordingly, it becomes possible for the user to easily and intuitively understand a sense of distance to an object corresponding to the presented additional information.

In this regard, the information presentation apparatus according to an embodiment of the present invention may use map-data providing means for providing additional information on buildings or the other surrounding spots in connection with position information of the corresponding buildings or other surrounding spots. It is possible to implement such map-data providing means by a map-data storage section storing additional information in the apparatus. Also, the map-data providing means may be a map-data-information database server, etc., which provides map data for a charge or free of charge on a wide area network, such as the Internet, or the like. In whichever form map data is provided, the additional information acquisition means estimates a shooting target area captured by the camera imaging section on the basis of the viewpoint information and the visual line information, and requests the additional information related to the shooting target area. The additional information acquisition means can make a request to the map-data providing means for additional information related to the estimated shooting target area (that is to say, additional information whose position information is contained in the shooting target area) using position information as a key.

Also, according to another embodiment of the present invention, there is provided a computer program, described in a computer readable format, for performing processing in order to present information to a user through an image, and causing the computer to perform processing, the processing including the steps of: acquiring an image captured by a camera imaging section capable of capturing an image of one or more objects being in the vicinity of the ground; acquiring viewpoint information related to a viewpoint position when the camera imaging section captures an image of the object; acquiring visual line information related to a visual line direction when the camera imaging section captures an image of the object; acquiring posture information related to posture when the camera imaging section captures an image of the object; acquiring additional information by relating additional information of the object to position information of the object; calculating horizon line information on the captured image from the visual line information or the posture information, and determining a reference line to be used when the additional information is displayed in the captured image on the basis of the horizon line information and the posture information; calculating distance information from the viewpoint position to the object on the basis of the position information and the viewpoint information; determining a display attribute including a display mode of the additional information in the image and a display position of the additional information in the image with respect to the reference line; and presenting the additional information on the captured image on the basis of the display attribute on a screen for displaying the captured image obtained by the step of acquiring an image.

The computer program according to the above-described embodiment of the present invention is a computer program defined in a computer readable format so as to perform predetermined processing on a computer. To put it another way, by installing the computer program according to the embodiment of the present invention, it is possible to obtain the same operational effects as that of the information presentation apparatus according to an embodiment of the present invention.

By the present invention, it is possible to provide an excellent information presentation apparatus, information presentation method, imaging apparatus, and computer program which are capable of preferably superimposing additional information on an image or a through-the-lens image captured by, for example, a digital video camera and a digital still camera.

Also, by the present invention, it is possible to provide an excellent information presentation apparatus, information presentation method, imaging apparatus, and computer program which are capable of preferably presenting information, such as names of buildings and the surrounding spots contained in a captured image or a through-the-lens image.

Also, by the present invention, it is possible to provide an excellent information presentation apparatus, information presentation method, imaging apparatus, and computer program which present information, such as names of buildings and the surrounding spots contained in a captured image or a through-the-lens image in order to allow a user to easily and intuitively understand a sense of distance to a subject.

In the information presentation apparatus according to an embodiment of the present invention, when additional information related to a subject is presented on a through-the-lens image by being superimposed, a display position and a size of the additional information on the screen are determined on the basis of a distance from the current position of the camera to the corresponding subject, the user can see the subject and the additional information with an intuitive relationship. For example, if two buildings are overlapped in the depth direction, it is possible for the user to understand which building is at the front rather than the case of simply displaying two pieces of information. Besides, if there is a hidden part, the user can understand that at the same time.

Other and further objects, features and advantages of the present invention will become apparent by the detailed description based on the following embodiments of the present invention and the accompanying drawings.

BRIEF DESCRIPTION OF THE DRAWINGS

FIG. 1 is a schematic diagram illustrating of a functional configuration of an information presentation apparatus 10 according to an embodiment of the present invention;

FIG. 2 is a diagram illustrating an example of a through-the-lens image viewed from a point of a photographer when there are objects at a near position and a far position from the photographer, respectively;

FIG. 3 is a diagram illustrating a state in which a direction of a visual line from a viewpoint position disposed above the ground to an object placed on the ground changes in accordance with a distance from the viewpoint to the object, and an observation point on a through-the-lens screen also changes;

FIG. 9A is a diagram illustrating a state in which a horizontal position of a through-the-lens image changes along with a change in posture of the camera imaging section 11;

FIG. 9B is a diagram illustrating a state in which a horizontal position of a through-the-lens image changes along with a change in posture of the camera imaging section 11, and is specifically a diagram illustrating a through-the-lens image when the camera imaging section 11 is rotated about a pitch axis from FIG. 9A;

DESCRIPTION OF THE PREFERRED EMBODIMENTS

Figure 4:
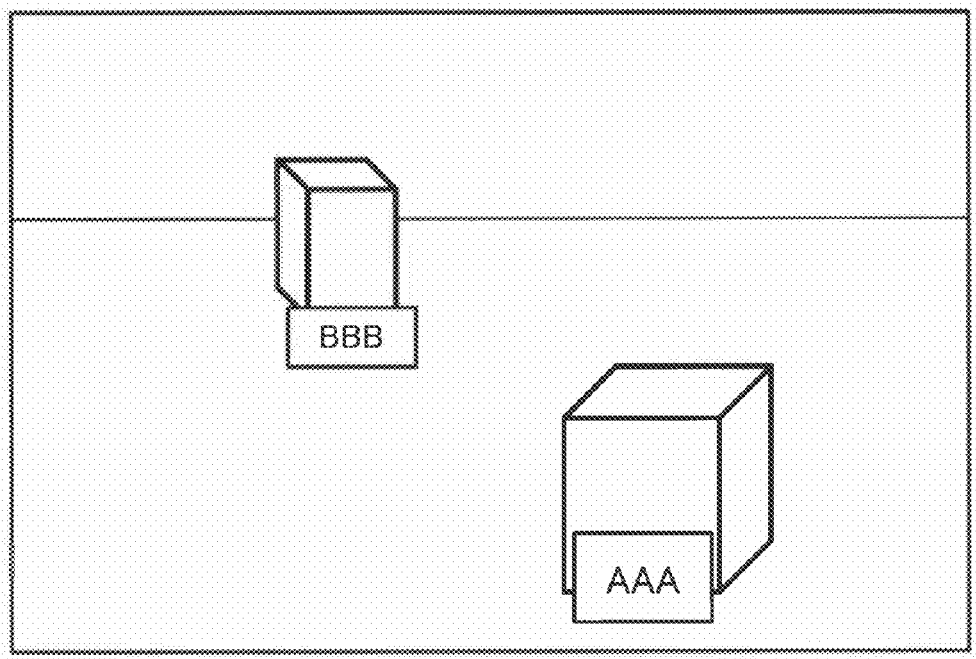
FIG. 4 is a diagram illustrating an example of a through-the-lens image on which additional information is superimposed at a position and with a size determined in accordance with a distance between a viewpoint position of a camera imaging section 11 and an object, and a visual line direction.

In the following, a detailed description will be given of an embodiment of the present invention with reference to the drawings.

FIG. 1 schematically illustrates a functional configuration of an information presentation apparatus 10 according to an embodiment of the present invention. The information presentation apparatus 10 shown in FIG. 1 is constructed, for example using a digital video camera or a digital still camera. In addition to a camera imaging section 11, the information presentation apparatus 10 includes a camera-position detection section 12, a camera-posture detection section 13, a wireless communication section 14 connecting to an access point, etc., of a public wireless LAN (Local Area Network) service, etc., a map-data storage section 15, control section 16 totally controlling the operation of the overall apparatus, and a finder 17 having a function of displaying a through-the-lens image, etc.

The information presentation apparatus 10 according to the present embodiment outputs an image captured by the camera imaging section 11 on the screen of the finder 17. Further, the information presentation apparatus 10 has a function of superimposing additional information, such as names of a building and the surrounding spots on a scenery image displayed on the finder 17. Also, the information presentation apparatus obtains information necessary for superimposing the surrounding spot information, such as a shooting position, a shooting direction, an object position, object information in order to implement this function.

The camera imaging section 11 includes an imaging device including a CCD, a CMOS, etc., and an optical system including a combination of one or more lenses for forming a subject image on an imaging plane of the imaging device, and a camera-signal processing section which performs processing on an image signal, such as white balance adjustment, etc. In the present embodiment, the camera imaging section 11 has a function of detecting a field of view of the camera. In this regard, a normal digital camera has a codec for coding and decoding the image signal, and a mass storage device for storing images. However, these are not directly related to the content of the present invention, and thus are omitted in FIG. 1.

The camera-position detection section 12 can obtain viewpoint information on a viewpoint position of the camera imaging section 11, which includes a latitude and a longitude of the current position using a receiving radio wave from an access point of a public wireless LAN service, etc.

Also, the camera-posture detection section 13 includes any one of sensors, such as a geomagnetic sensor, a gyroscope, an acceleration sensor, a gravity sensor, etc., for example. The camera-posture detection section 13 can obtain a self posture and a facing direction of the camera imaging section 11, that is to say, the visual line information on a visual line direction of the camera imaging section 11. Assuming that a posture of the camera imaging section 11 maintains horizontal position, it is sufficient that a posture about a pitch axis can be detected. However, in the present embodiment, it is assumed that a posture about a roll axis can also be detected.

The map-data storage section 15 stores, for example the surrounding spot information related to the buildings, etc., located here and there as additional information for each surrounding spot, and can serve as map-data providing means providing additional information as map data. Each piece of additional information is related to position information of the corresponding surrounding spot. For example, additional information of a surrounding spot in a certain area can be searched using a name of the surrounding spot or position information as a key. Here, it is assumed that any data format can be used for storing and managing additional information. Also, the information presentation apparatus 10 is allowed to obtain additional information of the surrounding spots from a map-data-information database server (called tentatively), which provides map data for a charge or free of charge, or to download the additional information to the map-data storage section 15 in addition to the additional information stored in the map-data storage section 15. The map-data-information database server is built on a wide area network, such as the Internet, for example. The information presentation apparatus 10 can access such a server through a public wireless LAN service by the wireless communication section 14.

When an object including the surrounding spots, such as buildings, a land mark, etc., become a subject, an information presentation apparatus 10 according to the present embodiment characteristically presents additional information on these objects onto the captured image or the through-the-lens image such that the user can easily understand a sense of distance to the object. Specifically, when additional information related to an object shot on the through-the-lens image are presented by being superimposed, the display position and the size of the additional information on the screen are determined on the basis of the distance from the current camera position to the corresponding subject, it is possible for the user to view the subject and the additional information with an intuitive positional relationship. In the following, a detailed description will be given of a method of presenting the related additional information by superimposition.

First, a description will be given of a position on which the additional information of the subject is displayed.

FIG. 2 illustrates an example of a through-the-lens image viewed from a point of a photographer (that is to say, a viewpoint position of the camera imaging section 11) when there are objects at a near position and a far position from the photographer, respectively. From FIG. 2, it is understood that the nearer an object is, the lower the object is viewed on the screen, and on the contrary, the farther an object is, the higher the object is viewed. This phenomenon occurs by the following reason. As shown in FIG. 3, visual lines of when viewing individual objects on the ground from a viewpoint position disposed above the ground are basically downward. However, the farther an object is from the viewpoint position, namely, object-1, object-2, . . . , object-N, the nearer to a horizon line the direction of the visual line becomes, and thus the higher the intersection point of the visual line with a display plane goes, that is to say, the higher an observation point on a through-the-lens image becomes.

For example, if a posture of the camera imaging section 11 is horizontal position, the horizon line position becomes a line passing through the vicinity of a center of the through-the-lens image. In the present embodiment, the horizon line is used as a reference line on the through-the-lens image when a display position of additional information on an object, such as the surrounding spots is determined. That is to say, a display position from the reference line of additional information to be presented on the through-the-lens image is determined in accordance with a distance from the viewpoint position of the camera imaging section 11 to an object. If the posture of the camera imaging section 11 is substantially horizontal position, additional information is disposed such that the nearer an object is from the viewpoint position, the lower the additional information is disposed, and the farther an object is, the nearer to the reference line of the through-the-lens image, the additional information is disposed. Also, a direction to an object is calculated from the viewpoint position of the camera imaging section 11 and a position of the object of which additional information is displayed at the same time. Together with these pieces of information, a calculation is made of where the additional information is disposed on the through-the-lens image, and the additional information is superimposed on the through-the-lens image.

FIG. 4 illustrates an example of a through-the-lens image on which additional information is superimposed at a position and with a size determined in accordance with a distance between a viewpoint position of a camera imaging section 11 and an object, and a visual direction. The reference line corresponding to the horizon line changes on the basis of the posture of the camera imaging section 11 itself. However, it is possible to modify the horizon line position at various postures by detecting a posture angle of the camera imaging section 11. Every time a change in the posture of the camera imaging section 11 is detected, the position of the reference line on the through-the-lens image is re-calculated, and the display position of the additional information with respect to the reference line is updated. This is just like dispositions when a man views a plurality of objects placed on the ground at various distances away, and thus looks intuitively.

Next, a description will be given of a display size of the additional information of the subject.

Additional information includes character information describing, for example names of buildings, the surrounding spot information, etc. The most important point on the size of a character font is that the nearer the character is, the larger the font size is, and the farther the character is, the smaller the font size is. Basically, the font size of the character included in the corresponding additional information is changed in accordance with the distance from the viewpoint position of the camera imaging section 11 to an object to be a subject. That is to say, the nearer an object is from the viewpoint position of the camera imaging section 11, the larger the character of the additional information is set to be, and the farther an object is, the smaller the character is set to be displayed. However, there are normally an upper limit and a lower limit as to a character font to be displayed, and the value varies discretely. Thus, it is not necessary to determine the size of the additional information simply in proportion to the distance.

Specifically, the size of character font is determined by the following procedure.

1. First, determine a nearest position and a farthest position on the basis of objects to be presented to the user.

2. Next, determine a minimum and a maximum font sizes on the basis of performance held by the camera imaging section 11 as a camera, such as an angle of view, a display resolution (or a size of the display).

In such a determination procedure, it is necessary to determine a shortest distance to an object and a longest distance to an object to be displayed in a through-the-lens image, and a minimum font size and a maximum font size to be displayed.

The character font size of the additional information can be determined in accordance with a distance to the corresponding surrounding spot. For example, it is assumed that scenery, such as a mountain is an object of shooting, and the distance of a nearest part of an object in the view is 5 km, and the distance of a farthest part of the object is 10 km. At the same time, it is assumed that a lowest limit of the font size is 5 point, and an upper limit of the font size is 20 point on the basis of the resolution of the display unit. Then, the font size of the additional information to be displayed can be assigned in accordance with the distance as shown in the following table.

TABLE 1

| | Object No | | | | |
|---|---|---|---|---|---|
| | 0 | 1 | 2 | 3 | 4 |
| Distance | 5.0 km | 6.0 km | 7.0 km | 8.0 km | 10 km |
| Font Size | 5 pt | 8 pt | 11 pt | 14 pt | 20 pt |

Assuming that a shortest distance and a longest distance of an object of shooting are d and D, respectively, a minimum font size and a maximum font size of a character are f and F, respectively, the display font size size can be determined by the following expression.

[Expression 1]

$$\text{size} = f + (F-f)/(D-d) \times \text{dist} \tag{1}$$

Also, in another method, if there are a plurality of objects in a view, a larger font size may be assigned to an object located at nearer position in sequence in accordance with a distance from the viewpoint position of the camera imaging section 11. For example, if the maximum number of pieces of information to be displayed is obtained, font sizes are assigned at equal intervals in sequence from the nearest object as shown in the below table. This gives sequence information of individual distances not proportionally to the distance.

TABLE 2

|  | Object No | | | | |
| --- | --- | --- | --- | --- | --- |
|  | 0 | 1 | 2 | 3 | 4 |
| Distance | 5.0 km | 6.0 km | 7.0 km | 8.0 km | 10 km |
| Font Size | 5 pt | 8 pt | 12 pt | 15 pt | 18 pt |

Assuming that a maximum number of objects whose additional information is to be displayed is N, the font size of the additional information of the n-th object in distance can be determined by the following expression.

[Expression 2]

$$\text{size} = f + (F - f)/N \times n \quad (2)$$

Figure 5:
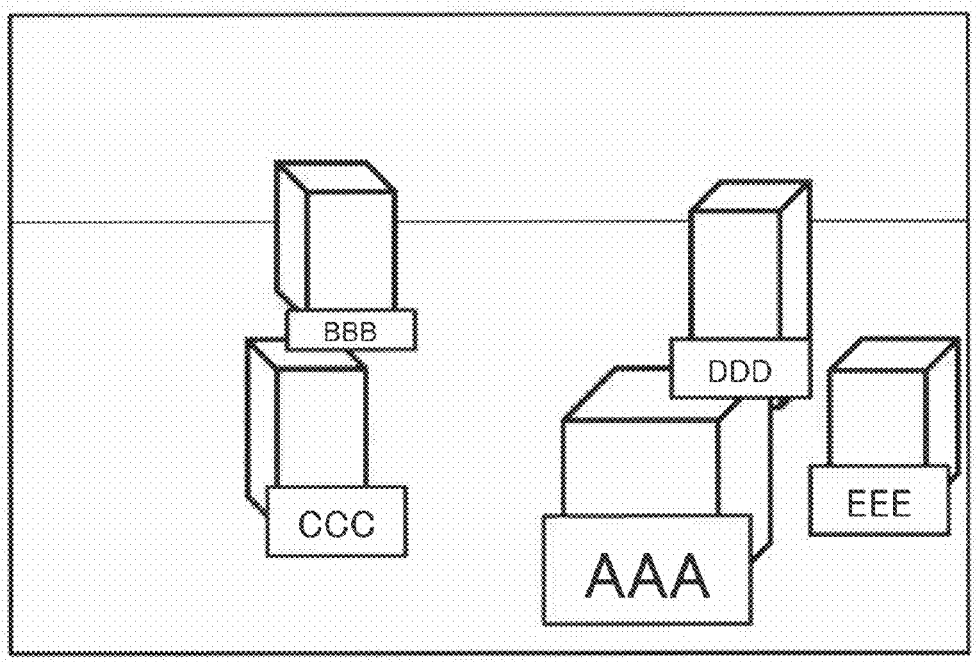
FIG. 5 is a diagram illustrating a state in which a size of additional information to be displayed for each object is adjusted in accordance with a distance between a viewpoint position of a camera imaging section 11 and the object.

FIG. 5 illustrates a state in which a character font size of additional information displayed on each object is adjusted in accordance with a distance from a viewpoint position of a camera imaging section 11 to the object.

As is understood by FIGS. 4 and 5, the position and the size of the additional information to be superimposed and related to each object included in the through-the-lens image are determined on the basis of a positional relationship of whether the object is near or far from the viewpoint position (namely, the user) of the camera imaging section 11. Thus, it becomes easy for the user to intuitively understand a sense of distance to the corresponding subject to the presented additional information.

Figure 6:
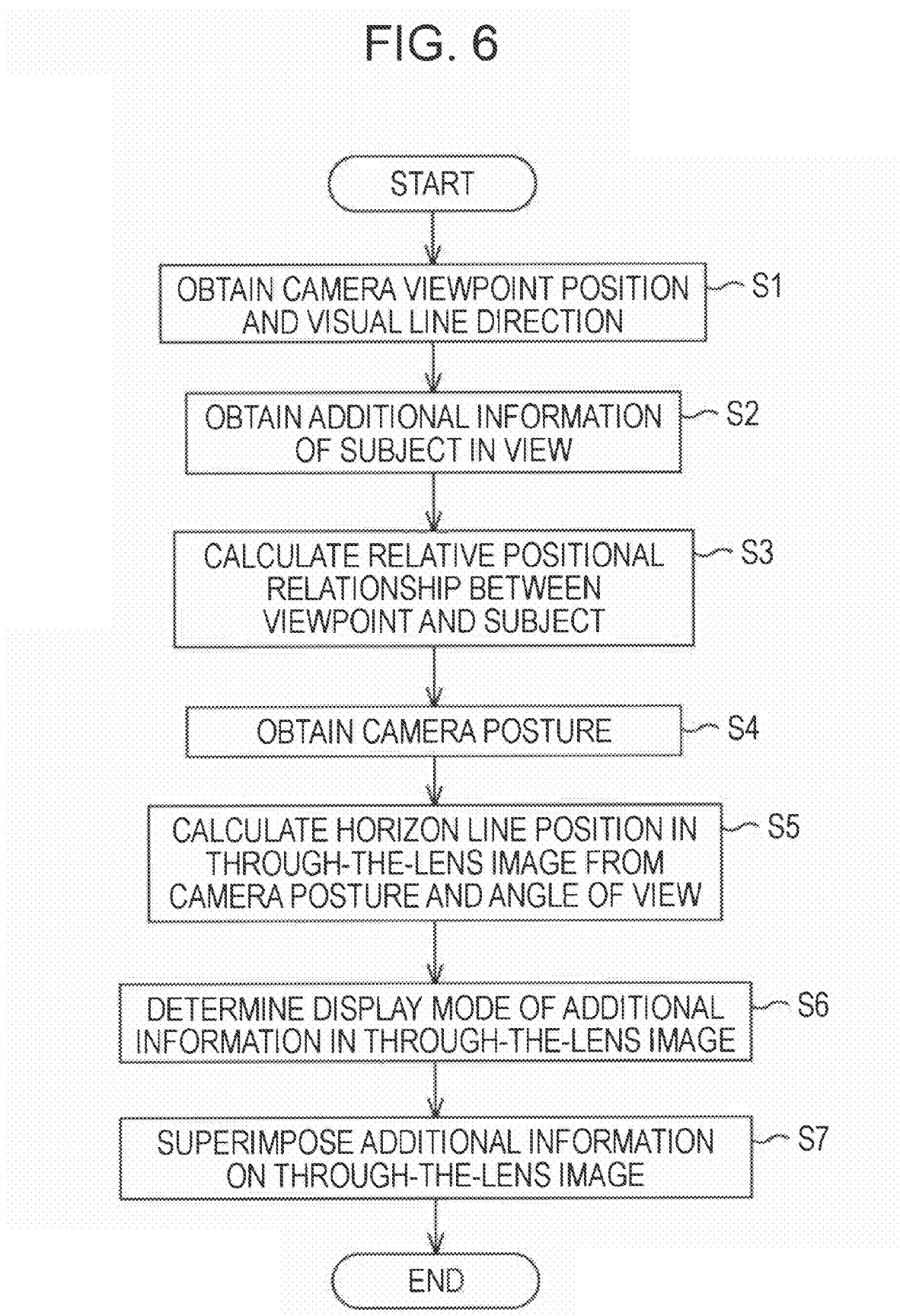
FIG. 6 is a flowchart illustrating a processing procedure for superimposing additional information of a subject on a through-the-lens image in the information presentation apparatus 10.

FIG. 6 is a flowchart illustrating a processing procedure for superimposing additional information of an object on a through-the-lens image in the information presentation apparatus 10. Such processing is performed actually by the control section 16 executing predetermined program code.

First, a viewpoint position of the current camera imaging section 11, that is to say, viewpoint position of the shooting image, and a visual line direction of the current camera imaging section 11, that is to say, visual line information of the shooting image are obtained on the basis of the receiving radio wave situation of a GPS or a wireless LAN using the camera-position detection section 12 (step S1).

Next, additional information related to an object contained in the captured image, that is to say, the surrounding spots, such as buildings, a land mark in the view is obtained on the basis of the obtained viewpoint position and visual line information of the current camera imaging section 11 in connection with the position information of each object (step S2).

Figure 7A:
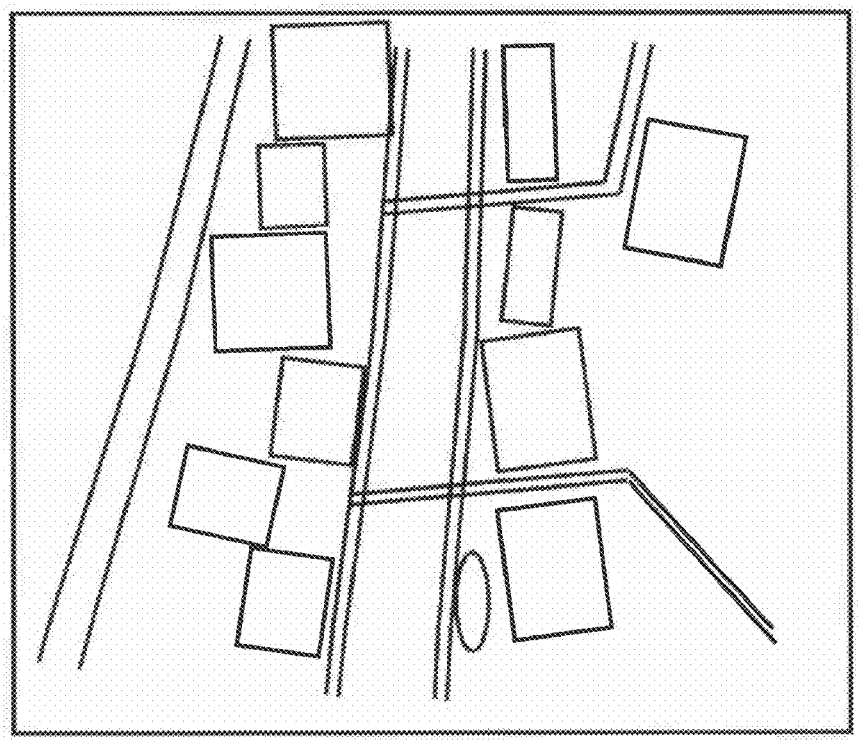
FIG. 7A is a diagram illustrating a map of the surroundings of a viewpoint position of a camera imaging section 11.
Figure 7B:
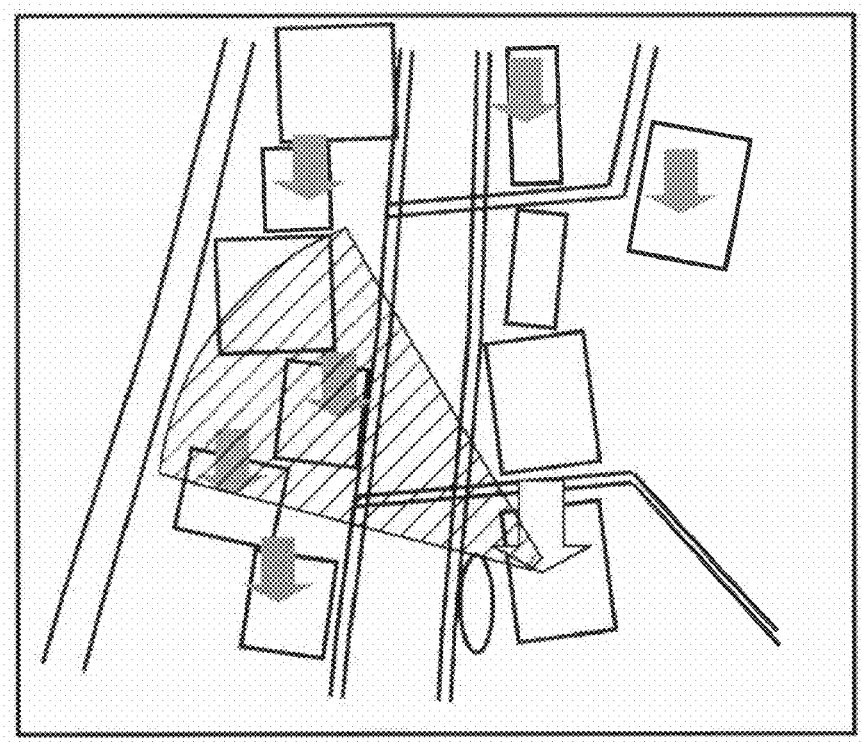
FIG. 7B is a diagram illustrating a state in which surrounding spot information is obtained on the basis of a viewpoint position and a visual line direction of the camera imaging section 11.

Specifically, as shown in FIG. 7B, a shooting target which is covered by the through-the-lens image, as shown by nearly a fan-shaped hatched area in the figure is estimated on a map as shown in FIG. 7A on the basis of the viewpoint position and the visual line information of the current camera imaging section 11. At the same time, the additional information stored in the map-data storage section 15 is related to the position information of an object (buildings, the surrounding spots). Also, in FIG. 7B, buildings having additional information is indicated by block arrows. The additional information on the buildings and the individual surrounding spots included in the through-the-lens image can be obtained from the map-data storage section 15 (described before) by a search using the position information of the surrounding spot name or the shooting target area as a key. Alternatively, necessary additional information may be obtained, not from the map-data storage section 15, but from the map-information database server on the Internet in sequence by connecting the wireless communication section 14 to a public wireless LAN service.

Next, a distance and a direction from the viewpoint position to the object, such as the surrounding spot, etc., that is to say, a relative relationship is calculated on the basis of the viewpoint position of the camera imaging section 11, obtained in step S1, and the position information of the object, obtained in step S2 (step S3).

Next, a measurement result of the posture (for example, about the pitch axis) of the camera imaging section 11 is obtained from the camera-posture detection section 13 (step S4).

If a visual line of a camera is horizontal position, the horizon line position becomes a line passing through the vicinity of a center of the through-the-lens image. In the present embodiment, the horizon line position on the through-the-lens image is determined by a geometrical calculation, etc., on the basis of the posture of the camera imaging section 11 obtained in step S4 (step S5). And the horizon line is used as a reference line for determining the display position of the additional information (described above).

Next, in step S3, a display mode of the additional information of the object on the through-the-lens image is determined on the basis of a relative relationship between the camera imaging section 11 and the object, which has been obtained in step S3 (step S6). Here, the "display model" of the additional information is a display position and a font size of the additional information on the through-the-lens image. Together with the calculation of the display position, the display size of the additional information is determined in accordance with the distance from the viewpoint position of the camera imaging section 11 to the object.

Specifically, if the visual line of the camera imaging section 11 is a substantially horizontal direction, the additional information is disposed such that the nearer an object is from the viewpoint position, the lower the additional information is disposed in the screen of the through-the-lens image. On the other hand, the farther an object is from the viewpoint position, the nearer to the reference line of the through-the-lens image, the additional information is disposed.

The individual pieces of the additional information is superimposed on the through-the-lens image at the display position and with the font size calculated in step S6, and then is displayed (step S7). The superimposed state is as shown in FIGS. 4 and 5.

As described with reference to FIG. 2, there is a characteristic in that the nearer an object from the viewpoint position the camera imaging section 11, the lower the object is viewed on the through-the-lens image, and on the contrary, the farther an object is, the higher the object is viewed. Accordingly, if the additional information is disposed as described above, it becomes easy for the user to intuitively understand a sense of a distance to the subject corresponding to the presented additional information.

At this time, each time a change in the posture of the camera imaging section 11 is detected, the processing shown in FIG. 6 is started, the reference line on the through-the-lens image is drawn again, the disposition of the additional information is recalculated, and the display of the additional information of the through-the-lens image is updated.

Figure 8:
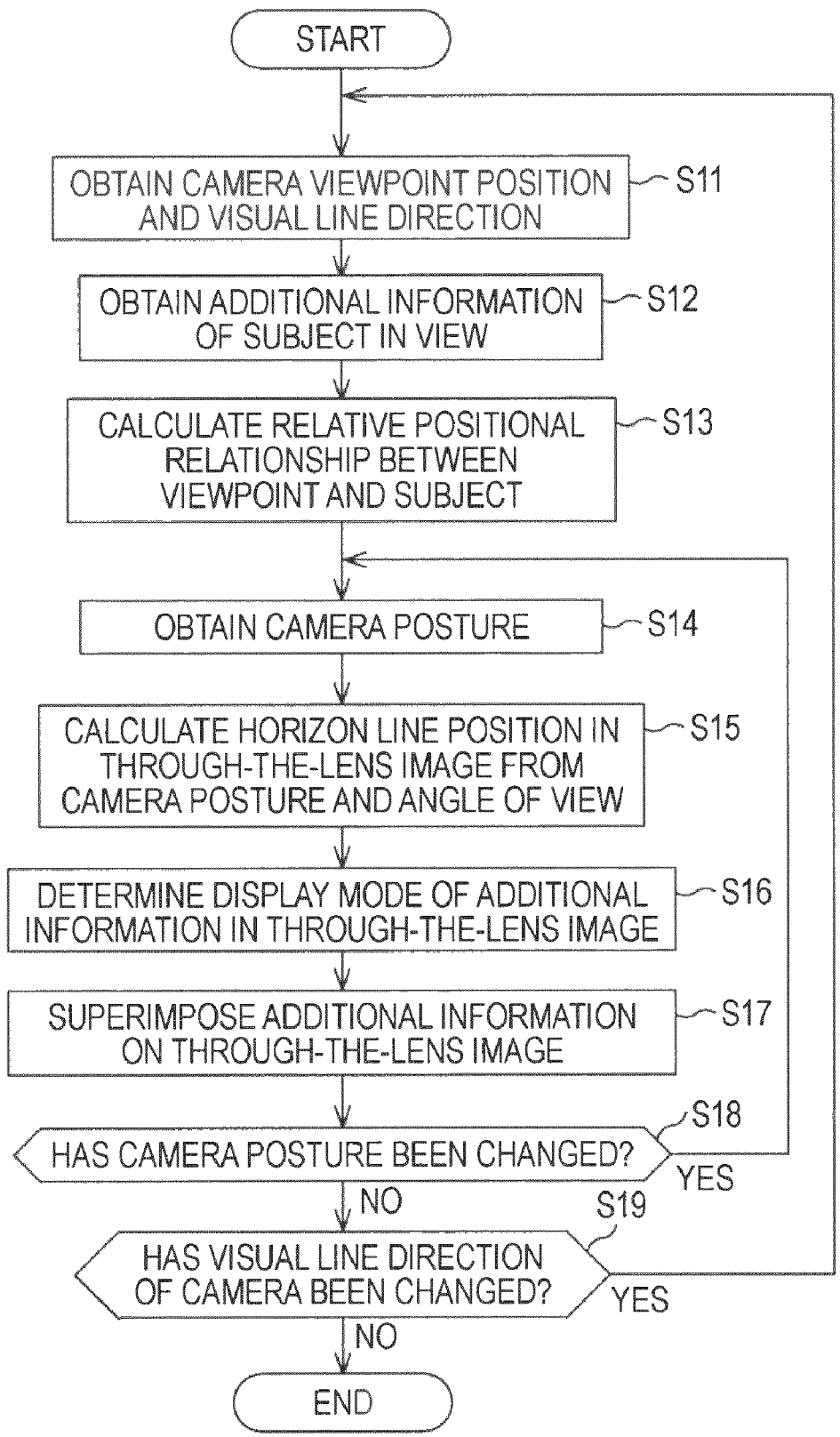
FIG. 8 is a flowchart illustrating a variation of the processing procedure for superimposing additional information of a subject on a through-the-lens image in the information presentation apparatus 10.

FIG. 8 is a flowchart illustrating a variation of the processing procedure for superimposing the additional information of an object viewed as a subject on a through-the-lens image in the information presentation apparatus 10. Such processing is actually performed by the control section 16 executing predetermined program code.

One of main different points from the processing procedure shown in FIG. 6 is the point in which when a posture of the camera imaging section 11, that is to say, at least one of the pitch angle and the roll angle has changed (Yes at step S18), the processing returns to step S14, the reference line is determined again by recalculating the horizon line, and a through-the-lens image is displayed with updated display position of the additional information.

Also, another different points from the processing procedure shown in FIG. 6 is the point in which when a viewpoint position of the camera imaging section 11 has changed, or when the visual line direction (or a yaw angle) of the camera imaging section has changed (Yes at step S19), the processing returns to step S11, the viewpoint position of the camera imaging section 11 is obtained again, additional information related to the surrounding spots in the view is searched again, a horizon line to be a reference line is calculated again, and a through-the-lens image is displayed with updated display position of the additional information.

In this regard, in the embodiment shown in FIG. 1, additional information of an object is superimposed on the through-the-lens image in the information presentation apparatus 10 having a camera imaging section 11. That is to say, image capturing and display of the captured image on the through-the-lens image are performed one single apparatus. However, the gist of the present invention is not limited to this. It is possible to perform image capturing and display of the captured image on individually different apparatuses.

For example, Exif (Exchangeable Image File Format) is familiar as an image-file standard format for a digital camera. In a user area provided in such a kind of format, the viewpoint position information on the viewpoint, the visual line information on the visual line direction of the camera imaging section 11 at shooting time, and the posture information on the posture of the camera imaging section 11 are recorded together with the image data. When an image data file is read from a recording medium on a same or different apparatus, the viewpoint position information, the visual line information, and the posture information of the camera imaging section 11 at shooting time are obtained together. Accordingly, the same processing procedure as shown in FIG. 6 can be performed, and thus as shown in FIGS. 4 and 5, it is possible to present additional information in a format which is easy for the user to intuitively understand a sense of distance to an object.

A description has been given limitedly of the case where the posture of the camera imaging section 11 is a horizontal position (refer to FIGS. 4 and 5). This corresponds to the case where the posture of the camera imaging section 11 changes about the pitch axis by $\theta_y$. In such a case, for example, as shown in FIGS. 9A and 9B, a horizon line to be a reference line for determining the display position of the additional information only changes upward and downward in accordance with the amount of rotation about the pitch axis on the through-the-lens image, and an angle of the horizon line does not change.

Figure 9C:
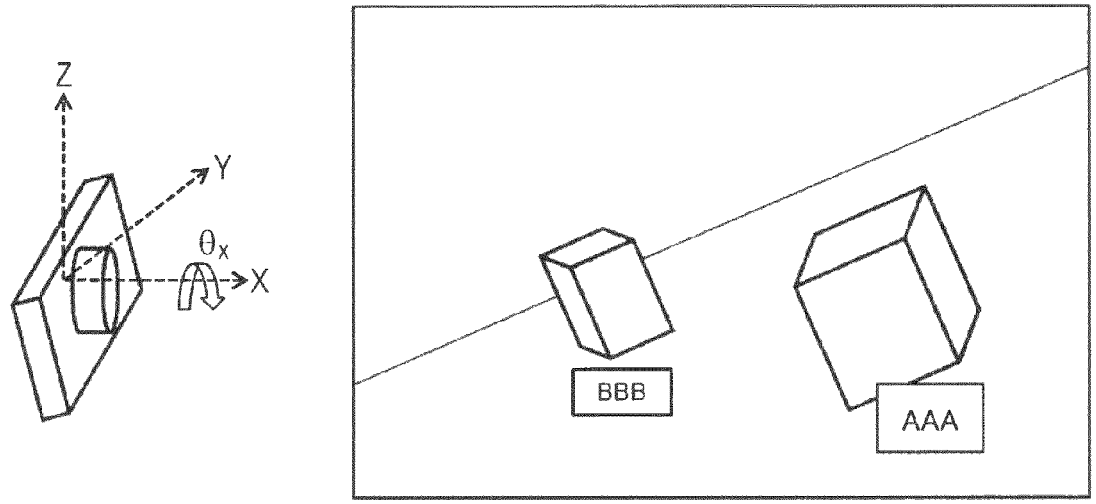
FIG. 9C is a diagram illustrating a state in which a horizontal position of a through-the-lens image changes along with a change in posture of the camera imaging section 11, and is specifically a diagram illustrating a through-the-lens image when the camera imaging section 11 is rotated about a roll axis from FIG. 9A.

In reality, if the user operates the camera imaging section 11 manually, the posture of the camera imaging section 11 also changes about the roll axis by $\theta_x$, and thus as shown in FIG. 9C, the angle of the horizon line changes on the through-the-lens image in accordance with the amount of rotation about the roll axis.

Figure 9D:
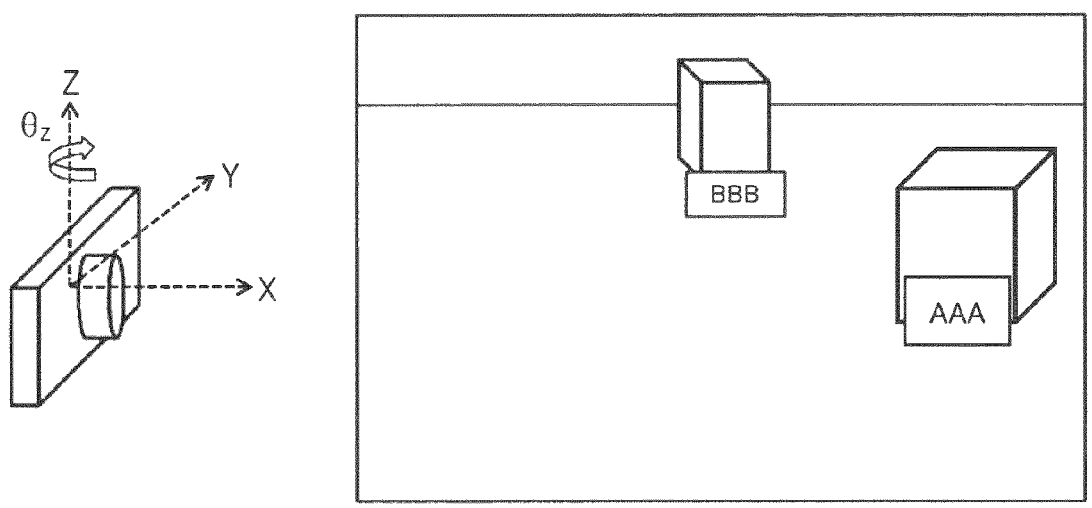
FIG. 9D is a diagram illustrating a state in which a horizontal position of a through-the-lens image changes along with a change in posture of the camera imaging section 11, and is specifically a diagram illustrating a through-the-lens image when the camera imaging section 11 is rotated about a yaw axis from FIG. 9A.

The camera-posture detection section 13 is configured so as to detect a posture both about the pitch axis and the roll axis (described above). Of course, by the camera-posture detection section 13, such as a gyroscope, etc., it is possible to detect a posture change of the camera imaging section 11 about the yaw axis. In this case, as shown in FIG. 9D, the position of the horizon line does not change, each object moves in the horizontal direction by the amount in accordance with the amount of rotation $\theta_z$ about the yaw axis. In this regard, the posture change about the yaw axis can be handled as a change in the visual line direction of the camera imaging section 11, and thus it is not necessary for the camera-posture detection section 13 to detect the posture about the yaw axis.

The amounts of rotation $\theta_x$, $\theta_y$, and $\theta_z$ about the pitch axis, the roll axis, and the yaw axis, respectively, can be detected by the camera-posture detection section 13, such as a gyroscope, etc. When additional information is displayed on the through-the-lens image, it is necessary to determine the number of pixels for the display position of the additional information to move per an angle change in the visual line direction of the camera imaging section 11 like this.

Figure 10:
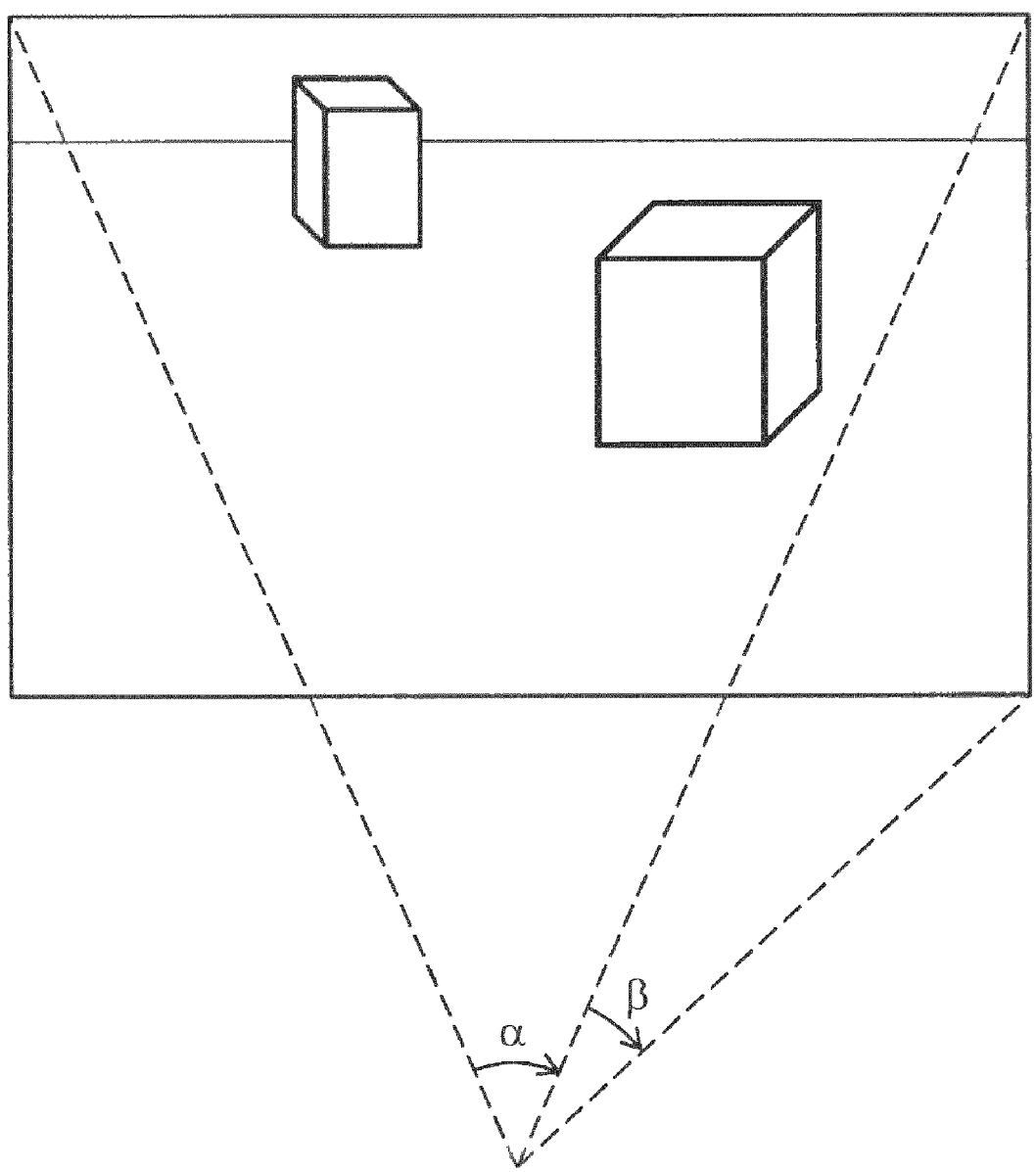
FIG. 10 is a diagram illustrating a method of determining the number of pixels per an angle change of a visual line direction of the camera imaging section 11.
Figure 11:
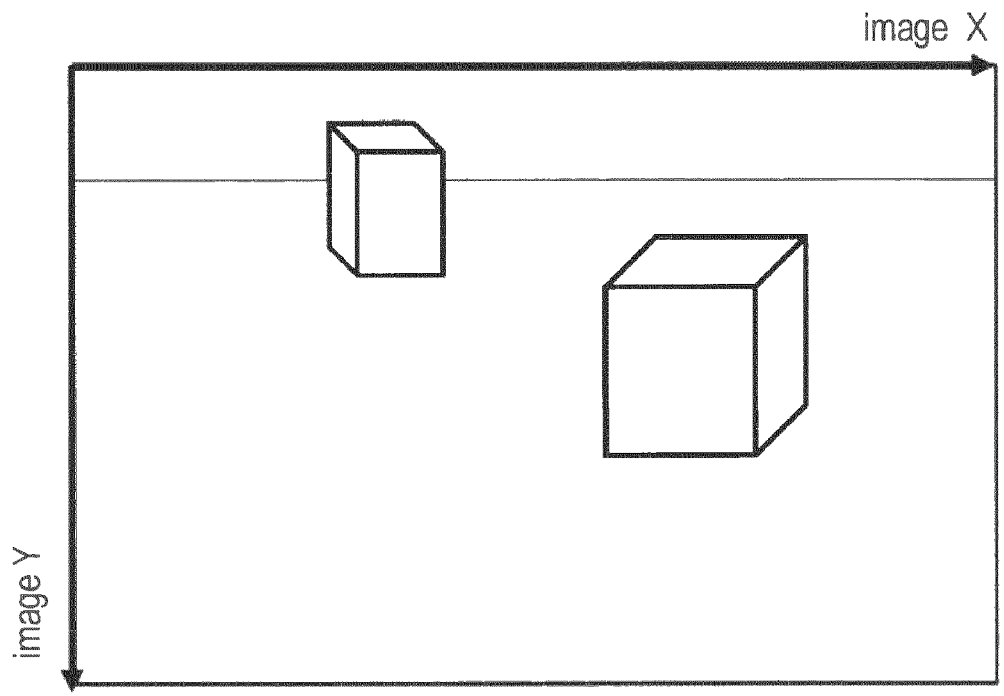
FIG. 11 is a diagram illustrating a method of deriving a display position of a horizon line in a through-the-lens image.

Assume that in the camera shooting section 11, a horizontal direction angle of view is $\alpha$, and a vertical direction angle of view is $\beta$ as shown in FIG. 10. Also, at that time, as shown in FIG. 11, assume that a horizontal pixel size and a vertical pixel size of the screen of the through-the-lens image are imageX and imageY, respectively. In this case, a shift length in horizontal direction is imageX [pixel] by $\alpha$ [deg], and a shift length in vertical direction is imageY [pixel] by $\beta$ [deg]. From this, it is possible to derive how many number of pixels a unit angle, namely 1 [deg], corresponds to. That is to say, the shift length is $\alpha$/imageX [deg/pixel] per 1 [deg] in horizontal direction, and $\beta$/imageY [deg/pixel] per 1 [deg] in vertical direction].

Next, a description will be given of a method of deriving the display position of horizon line on the through-the-lens image with reference to FIGS. 12 and 13.

Figure 12:
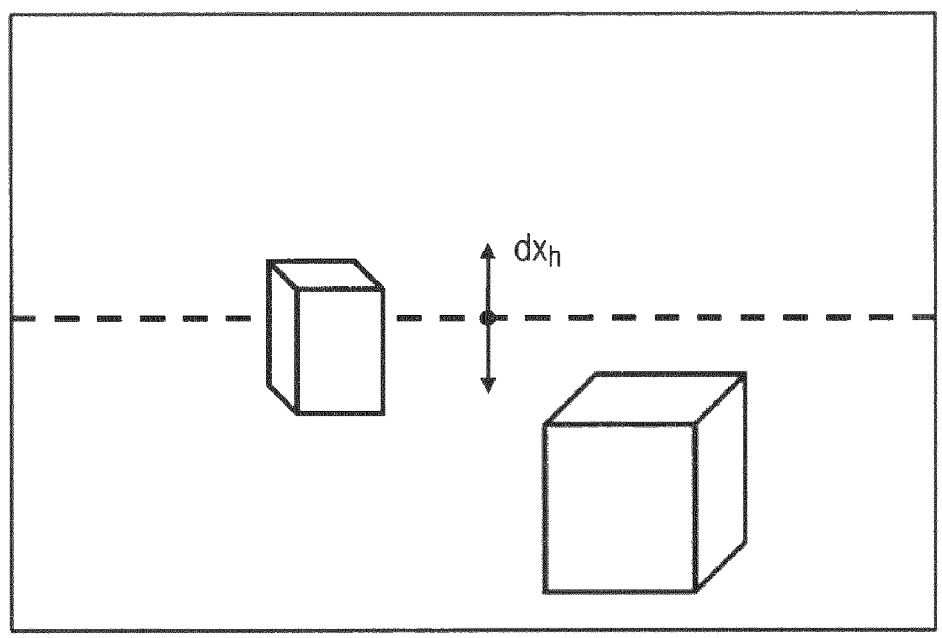
FIG. 12 is a diagram illustrating a method of deriving a display position of a horizon line in a through-the-lens image.
Figure 13:
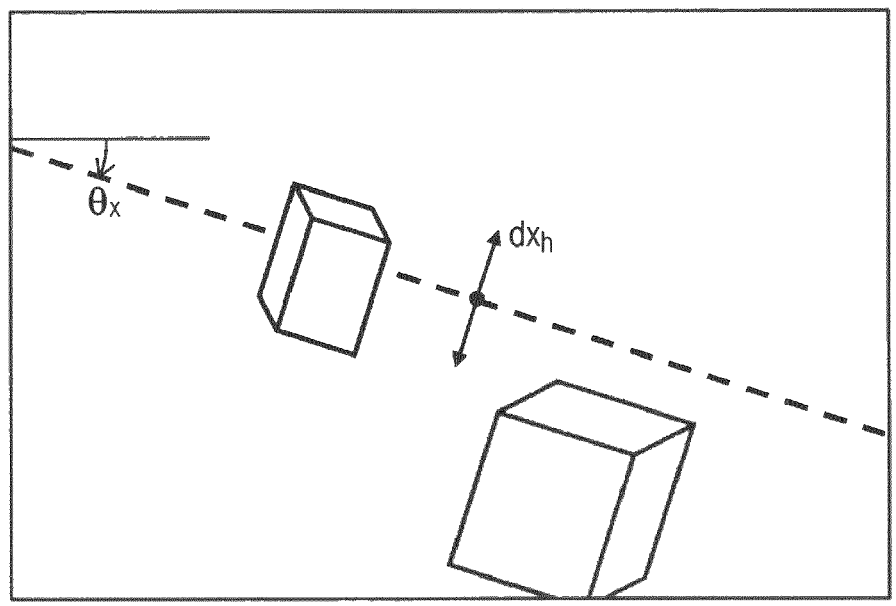
FIG. 13 is a diagram illustrating a method of deriving a display position of a horizon line in a through-the-lens image.

FIG. 12 illustrates a state in which the visual line direction of the camera imaging section 11 or the posture about the pitch axis changes by a pitch angle of $\theta_y$. The way of appearance of the horizon line changes in accordance with the posture of the camera imaging section 11 itself. When visual line direction of the camera imaging section 11 is horizontal, and the gravity direction is vertical, the horizon line on the through-the-lens image becomes a line passing horizontally through a reference point of the center of the screen. Here, assuming that the amount of shift $dx_h$ of the horizon line when the visual line direction of the camera imaging section 11 or the posture about the pitch axis changes by a pitch angle of $\theta_y$, the amount of shift $dx_h$ becomes the amount of shift per unit angle in the vertical direction. That is to say, the amount of shift is expressed by the following expression. The amount of shift of the horizon line at this time becomes perpendicular to the original horizon line.

[Expression 3]

$$dx_h = \theta_y \times \beta / \text{image}Y \qquad (3)$$

Next, a description will be given of a change of the horizon line when the posture of the camera imaging section 11 changes about the roll axis by a roll angle $\theta_x$ with reference to FIG. 13. The amount of shift of the horizon line at this time becomes perpendicular to the horizon line in the same manner. The horizon line passes through the center line with a gradient of $\theta_x$. Further, the amount of shift $dx_h$ of horizon line is produced in accordance with the pitch angle of $\theta_y$. At this time, $dx_h$ also becomes perpendicular to the horizon line.

Next, a description will be given of a method of determining the display position of the additional information to an object shot as a subject on the through-the-lens image.

Figure 14:
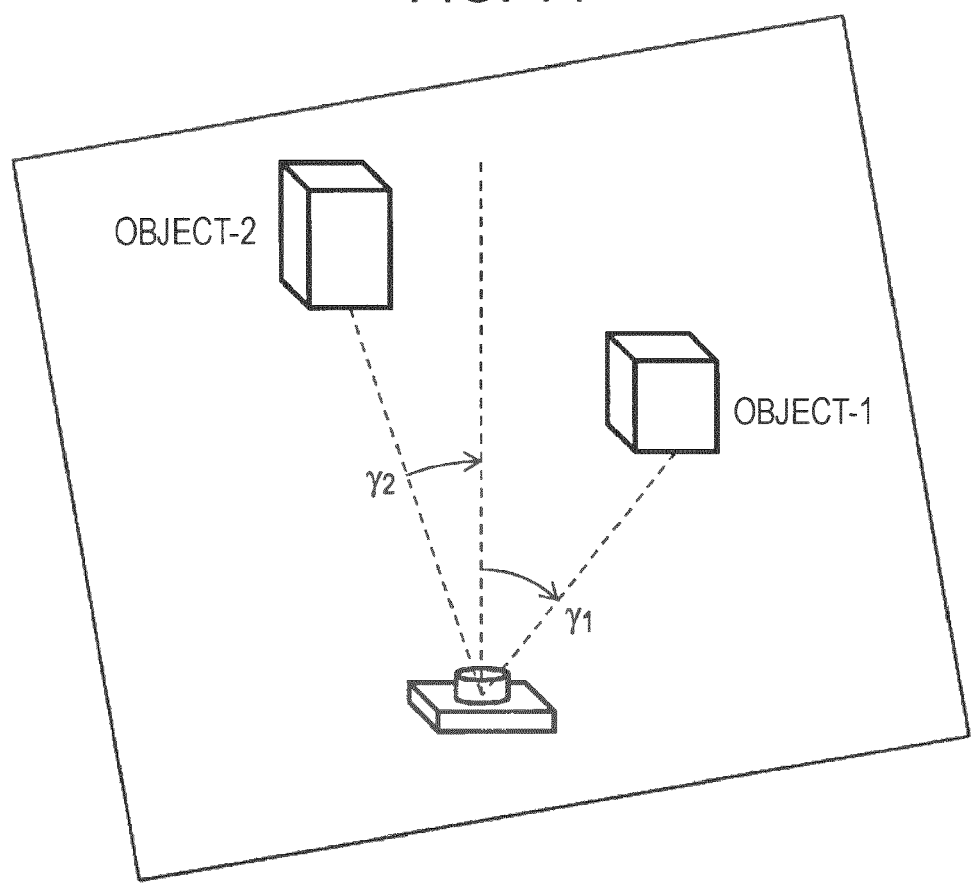
FIG. 14 is a diagram illustrating a method of determining a display position of additional information to a subject contained in a through-the-lens image.
Figure 15:
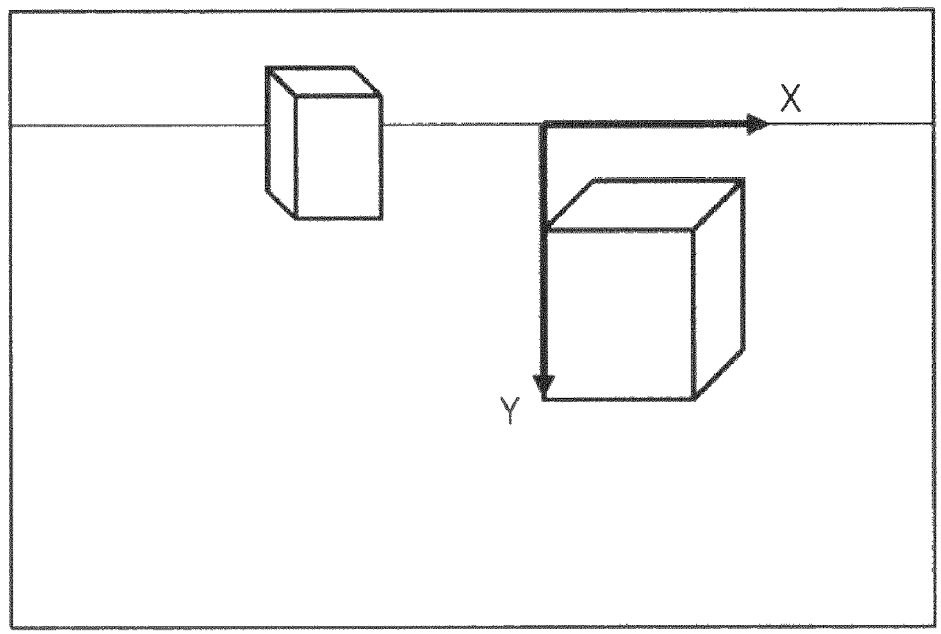
FIG. 15 is a diagram illustrating a method of determining a display position of additional information to a subject contained in a through-the-lens image.

Here, as shown in FIG. 14, it is assumed that there are two objects of shooting, namely, object-1 in a direction of $\gamma_1$ with respect to the visual line direction, and object-2 in a direction of $\gamma_2$ with respect to the visual line direction of the camera imaging section 11. Also, as shown in FIG. 15, a coordinate system is set such that the origin is placed on the reference point of the horizon line of the through-the-lens image with an X axis in the horizontal direction and a Y axis in the vertical direction.

Figure 16:
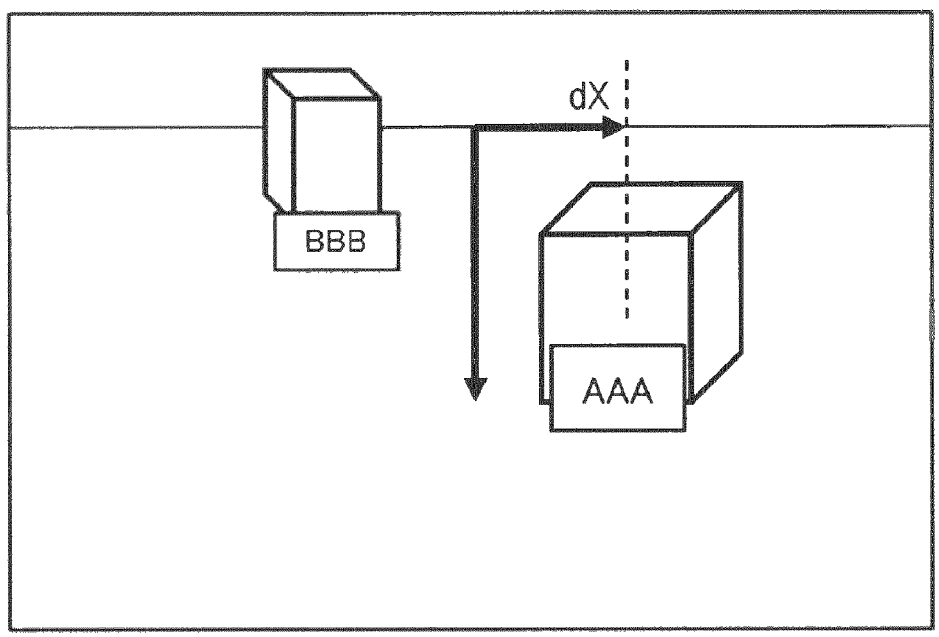
FIG. 16 is a diagram illustrating a method of determining a display position of additional information to a subject contained in a through-the-lens image.

First, a horizontal direction component dX is described. As shown in FIG. 16, it is assumed that the horizontal direction component of the display position of the additional information to an object shot on the through-the-lens image is dX [pixel]. The horizontal direction component dX depends on a relative angle to the visual line direction of the camera imaging section 11. In the example shown in FIG. 14, when additional information of object-1 is displayed, a relative angle with respect to the visual line direction becomes $\gamma_1$. The amount of shift per unit angle in the horizontal direction is $\alpha$/imageX [deg/pixel] (described above), and thus the amount of shift in the X axis direction is expressed by the following expression.

[Expression 4]

$$dX = \gamma \times \alpha / \text{image}X \quad (4)$$

Thus, the display position x in the horizontal direction becomes the following expression.

[Expression 5]

$$x = \text{image}X/2 + dX = \text{image}X/2 + \gamma \times \alpha / \text{image}X \quad (5)$$

Figure 17:
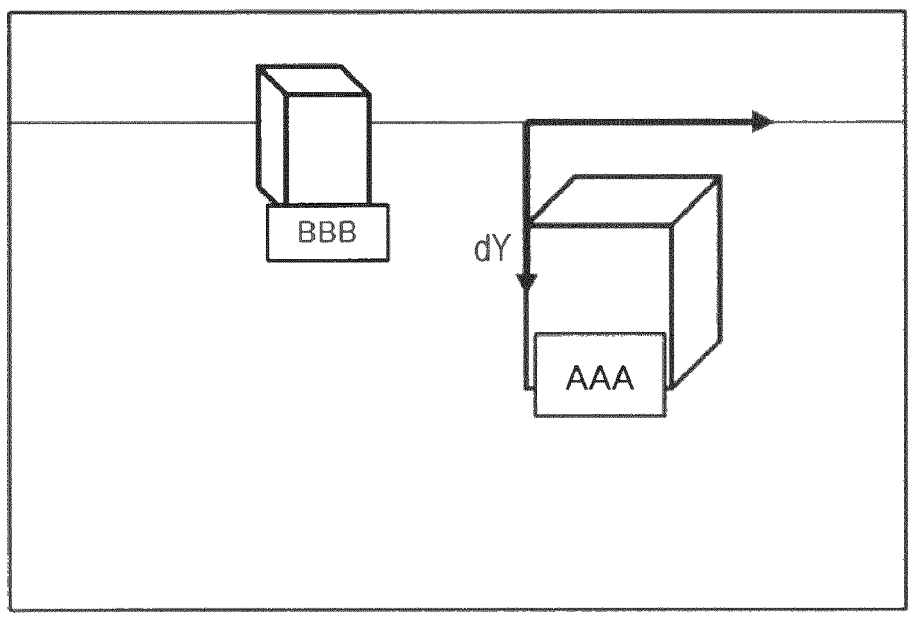
FIG. 17 is a diagram illustrating a method of determining a display position of additional information to a subject contained in a through-the-lens image.
Figure 18:
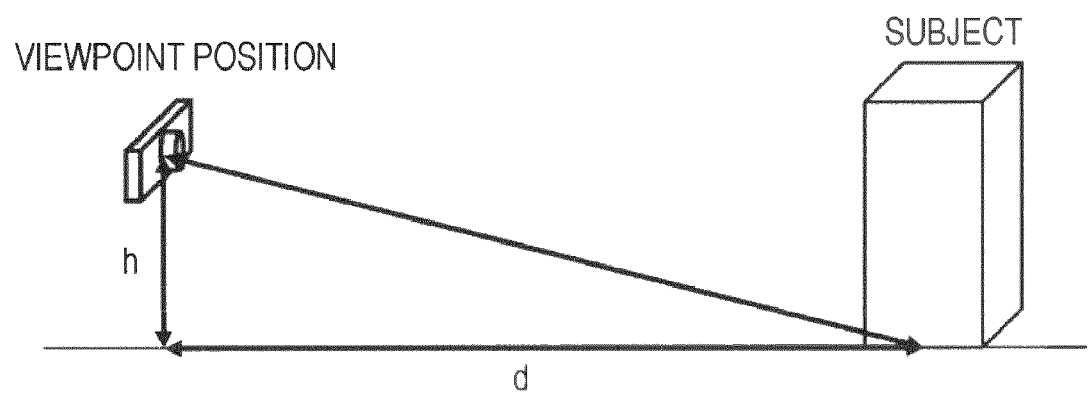
FIG. 18 is a diagram illustrating a method of determining a display position of additional information to a subject contained in a through-the-lens image.

Next, a vertical direction component dY is described. As shown in FIG. 17, it is assumed that the vertical direction component of the display position of the additional information to an object shot on the through-the-lens image is dY [pixel]. Also, as shown in FIG. 18, a height of the camera imaging section 11 is h [m], and a distance from the viewpoint position of the camera imaging section 11 to the object is d [m]. Also, assuming that a minimum shooting distance in the through-the-lens image at horizontal time, which is obtained from the camera angle of view $\beta$, is D [m], D is expressed by the following expression.

[Expression 6]

$$D = \frac{h}{\tan\beta} \quad (6)$$

Using the above, the vertical difference dY [m] is obtained from the horizon line position as the following expression.

[Expression 7]

$$dY = \frac{\text{image}Y}{2} \frac{\sqrt{h^2 + D^2}}{\sqrt{h^2 + d^2}} \quad (7)$$

Here, imageY is the total number of pixels of the through-the-lens image in the vertical direction. Thus, the display position y in the vertical direction becomes as the following expression.

[Expression 8]

$$y = \text{image}Y/2 + dY \quad (8)$$
$$= \text{image}Y/2 + \frac{\text{image}Y}{2} \frac{\sqrt{h^2 + D^2}}{\sqrt{h^2 + d^2}}$$
$$= \text{image}Y/2 + \left(\frac{\sqrt{h^2 + D^2}}{\sqrt{h^2 + d^2}} + 1\right)$$

From the above, the display position dX and dY of the additional information is obtained from the horizon line to be a reference line. By displaying additional information of each object at the display position, it is possible to present additional information of a plurality of objects to the user so as to allow the user to intuitively understand a sense of distance.

Figure 19:
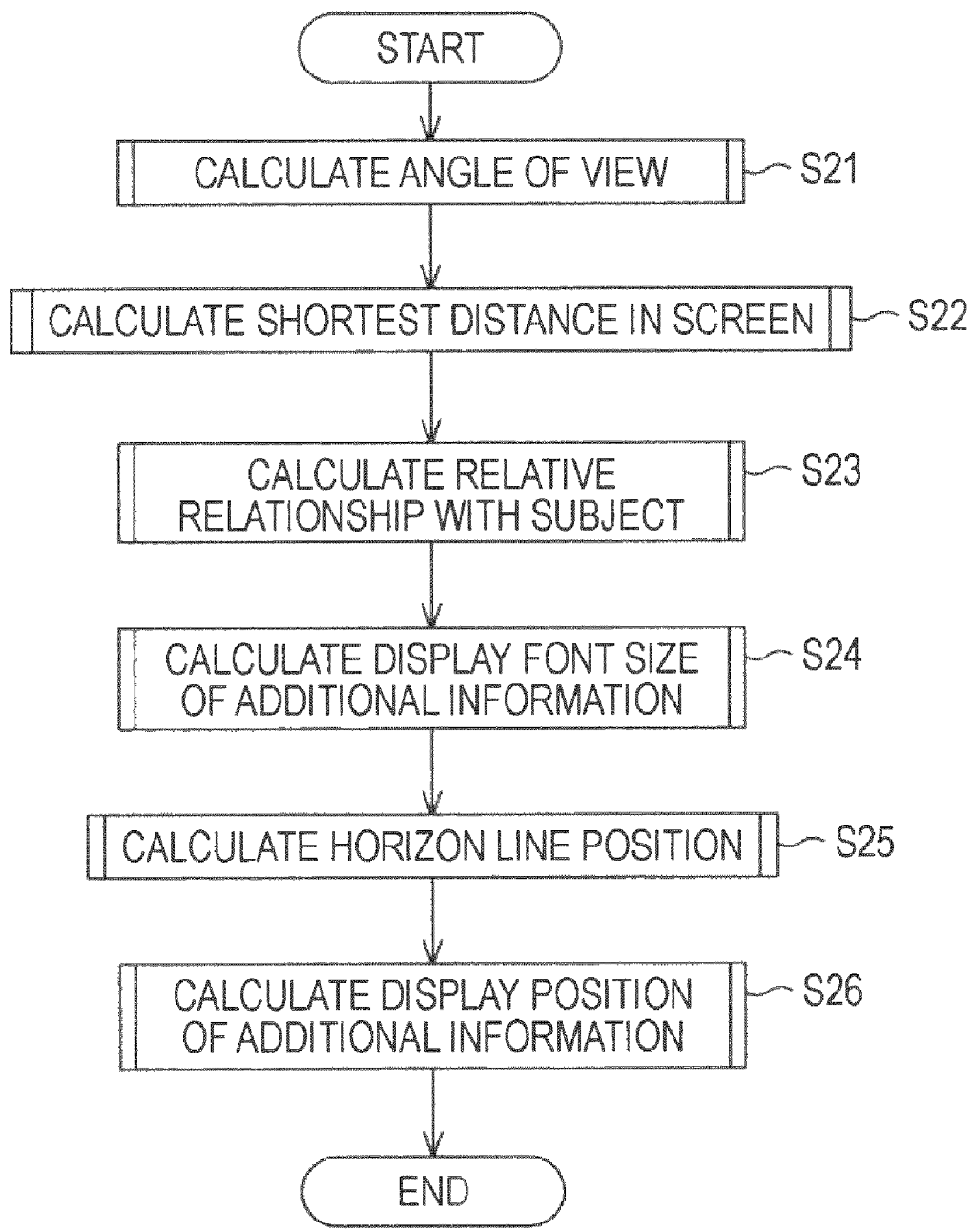
FIG. 19 is a flowchart illustrating a detailed processing procedure for calculating a display position of additional information, which is performed in step S6 in the flowchart shown in FIG. 6.

FIG. 19 is a flowchart illustrating a detailed processing procedure for determining a method of displaying the additional information, which is performed in step S6 in the flowchart shown in FIG. 6. Such processing is performed actually by the control section 16 executing predetermined program code.

First, an angle of view is calculated on the basis of the zoom level of the current lens of the camera imaging section 11 (step S21).

Next, a shortest distance contained in the screen of the finder 17 to which the through-the-lens image is output is obtained from the angle of view obtained by step S21 (step S22).

Next, position information of an object in the vicinity is obtained, and a relative distance and a relative angle of the object with respect to the current viewpoint position of the camera imaging section 11 is calculated (step S23). It is assumed that additional information stored in the map-data storage section 15 is related to position information of the corresponding object (buildings, the surrounding spots), and when additional information is searched using the current viewpoint position (a covered area to be shot from the viewpoint position) of the camera imaging section 11 as a key, the position information of the object can also be obtained.

Next, the font size with which the additional information is displayed is calculated on the basis of the relative distance to the subject (step S24).

Next, the horizon line position to be a reference line for determining the display position of the additional information is calculated on the basis of the posture of the camera imaging section 11, which has been detected by the camera-posture detection section 13 (step S25).

The display position of the additional information on the through-the-lens image is derived in accordance with the obtained reference line (step S26). Each additional information is superimposed at the display position and with the font size obtained in this manner on the through-the-lens image.

In the following, descriptions will be given of methods of calculation performed in individual steps S21 to S26.

Figure 20:
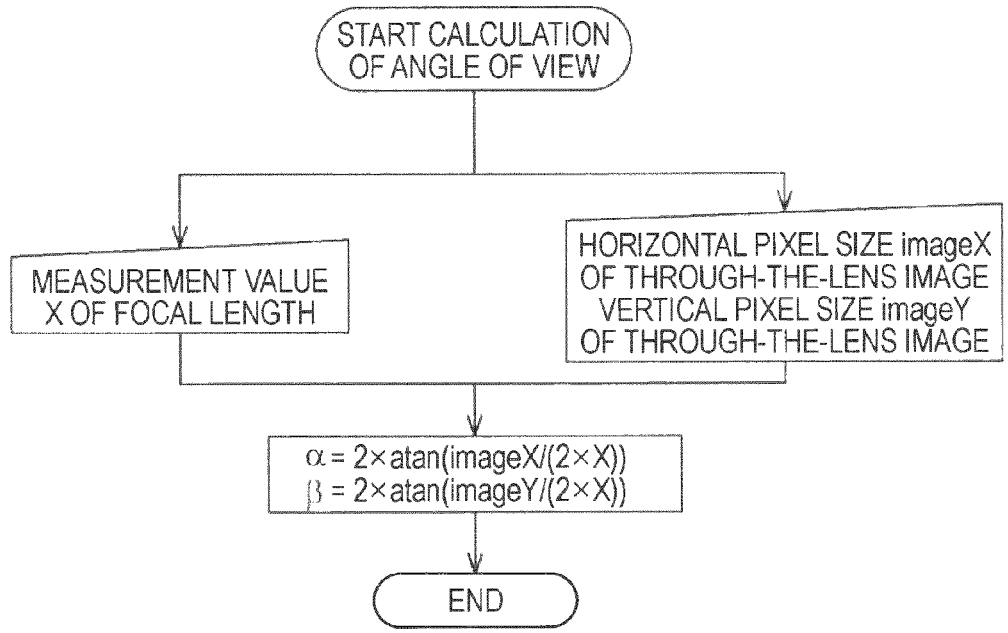
FIG. 20 is a flowchart illustrating a method of calculating an angle of view in step S21.

FIG. 20 is a flowchart illustrating the method of calculating an angle of view in step S21.

In order to calculate an angle of view, a focal length x of the optical system of the camera imaging section 11, a horizontal pixel size imageX, and a vertical pixel size imageY are used as input. Here, the focal length x (corresponding to 35 mm) can be detected from a camera main body, and the pixel sizes imageX and imageY of the through-the-lens image are constants dependent on the camera main body.

Next, the angle of view $\alpha$ in the horizontal direction and the angle of view $\beta$ in the vertical direction can be obtained from the following expressions, and these are output as a calculation result of the angle of view.

[Expression 9]

$$\alpha = 2 \times a\tan(imageX/(2\times X)) \quad (9)$$

$$\beta = 2 \times a\tan(imageY/(2\times X))$$

Note that a relationship between the focal length of the camera imaging section 11 and an angle of view may be obtained from the above expressions. However, an error becomes larger near a wide angle, and the values are specific to the body with no change after obtained once. It is therefore allowed to store a table including pre-calculated results in a ROM (Read Only Memory).

Figure 21:
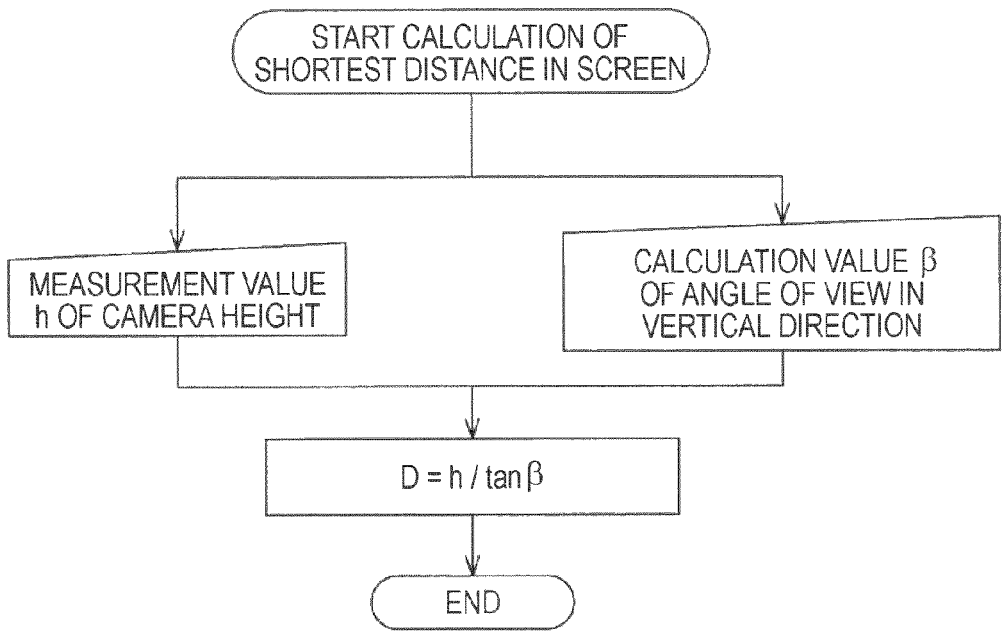
FIG. 21 is a flowchart illustrating a method of calculating a shortest distance in a screen in step S22.

FIG. 21 is a flowchart illustrating a method of calculating a shortest distance in a screen in step S22.

In order to calculate a shortest distance in the screen, a height h [m] of a camera, and a calculation value β [rad] of an angle of view in the vertical direction are used as input. Here, the height h [m] of the camera can be obtained from barometer (not shown in the figure), etc. Also, the angle of view β in the vertical direction is obtained from the preceding step S21.

Also, a shortest distance D [m] shot in the through-the-lens image at the time of facing to the horizontal direction can be obtained from the following expression, and this is output as the calculation result of the shortest distance in the screen.

[Expression 10]

$$D = h/\tan\beta \quad (10)$$

Figure 22:
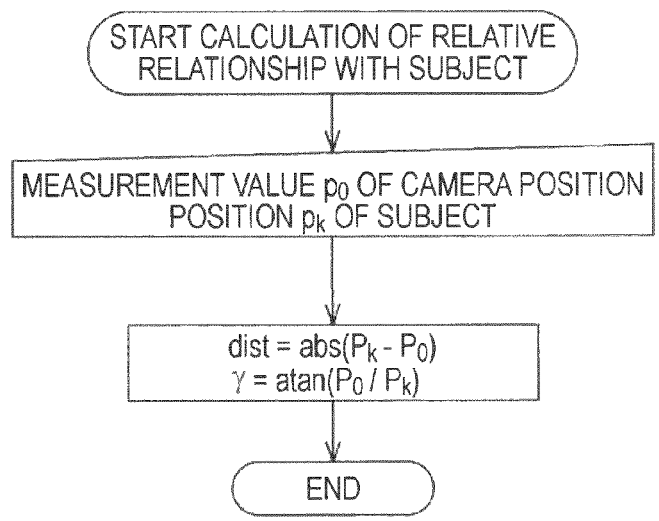
FIG. 22 is a flowchart illustrating a method of calculating a relative relationship between a viewpoint position of a camera imaging section 11 and a subject to which additional information is displayed in step S23.

FIG. 22 is a flowchart illustrating a method of calculating a relative relationship between a viewpoint position of the camera imaging section 11 and an object to which additional information is displayed in step S23.

In order to calculate a relative positional relationship with the object whose additional information is displayed, the current position coordinates $p_0$ of the camera imaging section 11 and the position coordinates $p_k$ of the subject are used as input. Here, the current position coordinates $p_0$ of the camera imaging section 11 can be measured by the camera-position detection section 12 using a receiving radio wave state from, for example a GPS signal, an access point of a public wireless LAN service, etc. Also, the position coordinates $p_k$ of the subject is obtained, for example, at the time of searching additional information from map-data storage section 15 at the same time.

Also, the relative distance dist from the viewpoint position of the camera imaging section 11 to the object and a relative angle γ can be obtained by the following expressions, respectively, and these are output as the calculation result of the relative positional relationship.

[Expression 11]

$$dist = abs(p_k - p_0) \quad (11)$$

$$\gamma = a\tan(p_0/p_k)$$

Figure 23:
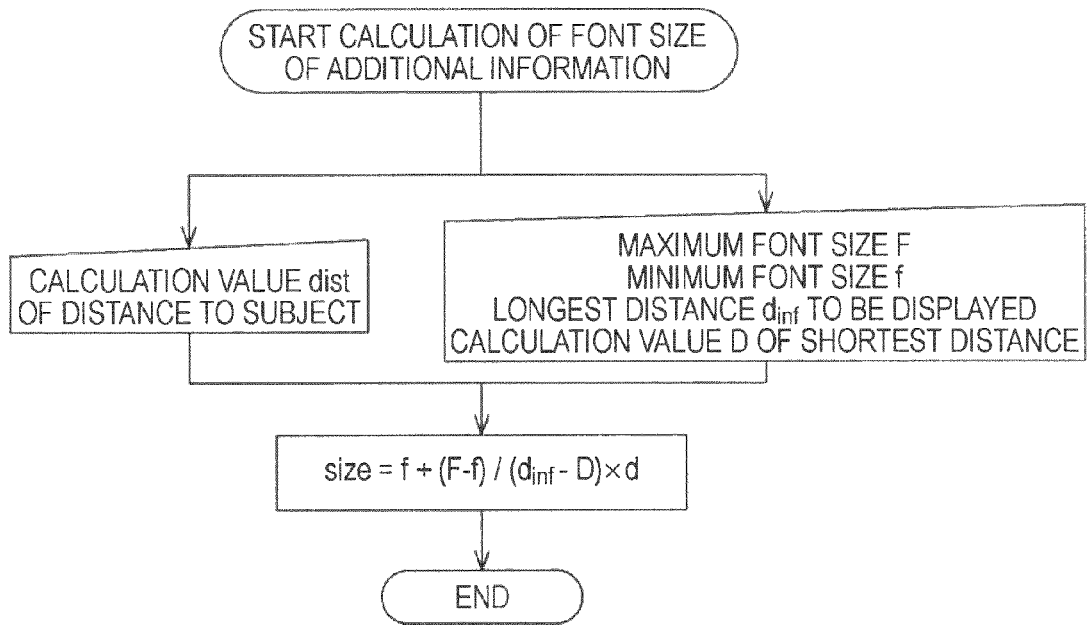
FIG. 23 is a flowchart illustrating a method of calculating a font size with which additional information is displayed in step S24.

FIG. 23 is a flowchart illustrating a method of calculating a font size with which additional information is displayed in step S24.

In order to calculate a display font size of the additional information, a distance dist from the viewpoint position of the camera imaging section 11 to the object, a maximum font size F, a minimum font size f, a farthest distance $d_{inf}$ to display, and a calculation value D of a shortest distance on the through-the-lens image are used as input. Here, the maximum font size F, the minimum font size f, and the farthest distance $d_{inf}$ to display are constants that are changed by the display and application installed on the information presentation apparatus 10. Also, for the distance dist to the subject, and the shortest distance D, the calculation results of the preceding step S23 and step S22 can be used, respectively.

Also, the display font size size of the additional information can be obtained from the following expression, and this is output as the calculation result of the font size depending on the distance.

[Expression 12]

$$size = f + (F-f)/(d_{inf} - D) \times d \quad (12)$$

Figure 24:
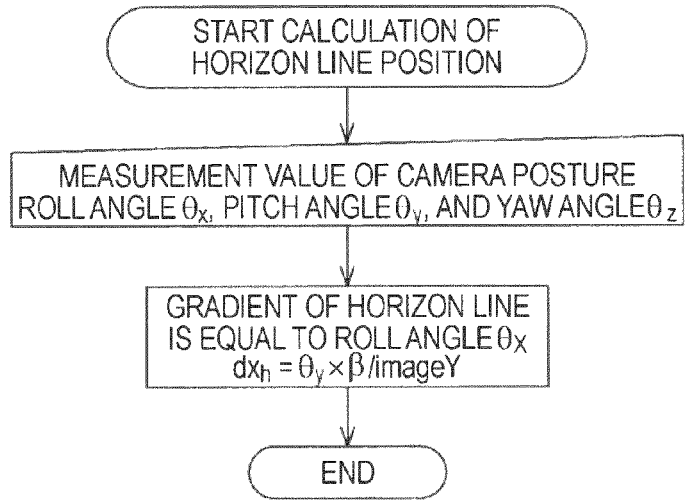
FIG. 24 is a flowchart illustrating a method of calculating a position of a horizontal line to be a reference line for determining a display position of additional information in step S25.

FIG. 24 is a flowchart illustrating a method of calculating a position of the horizontal line to be a reference line for determining a display position of the additional information in step S25.

In order to calculate the position of the horizon line in the through-the-lens image, a roll angle $\theta_x$, a pitch angle $\theta_y$, and a yaw angle $\theta_z$ of the camera imaging section 11, which are measured by the camera-posture detection section 13, are used as input.

The gradient of the horizon line becomes equal to the roll angle $\theta_x$ of the posture of the camera imaging section 11. Also, the amount of shift $dx_h$ of the horizon line position is obtained by the following expression. Here, the calculation results in the preceding step S21 ought to be assigned to the angle of view β in the vertical direction and the pixel size imageY of the through-the-lens image in the vertical direction.

[Expression 13]

$$dx_h = \theta_y \times \beta/imageY \quad (13)$$

Figure 25:
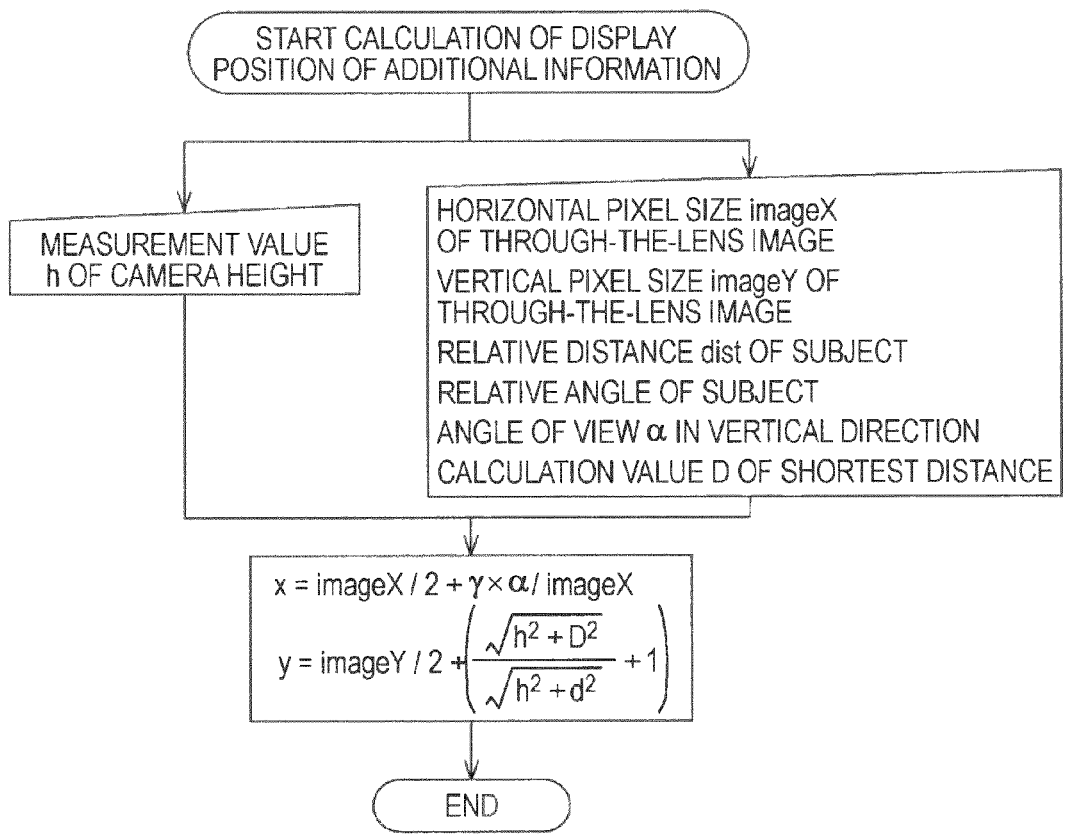
FIG. 25 is a flowchart illustrating a method of calculating a display position of additional information in step S26.

FIG. 25 is a flowchart illustrating a method of calculating a display position of additional information in step S26.

In order to calculate the display position of the additional information, a measurement value h [m] of the height from the ground to the camera imaging section 11, the pixel sizes imageX and imageY in horizontal and vertical directions, respectively of the through-the-lens image, the relative distance dist and the relative angle γ of the object corresponding to the additional information, the angle of view α in the horizontal direction, and the calculation value D of the shortest distance in the through-the-lens image are used as input. Here, sensor input from a barometer, etc., ought to be used for the height of the camera h [m] (described above). Also, the pixel sizes imageX and imageY of the through-the-lens image in the horizontal direction and the vertical direction, respectively, are characteristic values of the body, the relative distance dist and the relative angle γ of the object is the calculation result of the preceding step S23, the angle of view α in the horizontal direction is the calculation result of step S21, and the shortest distance D in the through-the-lens image is the calculation result of the preceding step S22.

The display position coordinates (x, y) of the additional information in the through-the-lens image can be obtained by the following expression, and this is output as the calculation result. Also, at the time of displaying the additional information, the font size size obtained in the preceding step S24 is used.

[Expression 14]

$$x = imageX/2 + \gamma \times \alpha / imageX \qquad (14)$$
$$y = imageY/2 + \left(\frac{\sqrt{h^2 + D^2}}{\sqrt{h^2 + d^2}} + 1\right)$$

The present application contains subject matter related to that disclosed in Japanese Priority Patent Application JP 2008-121668 filed in the Japan Patent Office on May 7, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method of presenting information, the method capable of displaying, on a display unit, an image including one or more objects being in the vicinity of the ground, the method comprising the steps of:

acquiring viewpoint information related to a display of the image;

acquiring visual line information related to a display of the image;

acquiring posture information related to a display of the image;

acquiring additional information by relating additional information of the object to position information of the object;

calculating horizon line information in the image on the basis of the visual line information by calculation means;

determining a reference line on the image on the basis of the horizon line information and the posture information by calculation means;

calculating distance information from the viewpoint position to the object on the basis of the position information and the viewpoint information by calculation means;

determining a display attribute of the additional information including a display mode of the additional information in the image and a display position of the additional information in the image with respect to the reference line by calculation means; and presenting the additional information on the basis of the display mode so as to reveal a relationship between the additional information and the object when displaying the image on the display unit.

2. The method of presenting information according to claim 1, wherein the viewpoint information, the visual line information, and the posture information are detected by a movable information processing apparatus having a function of detecting a position and posture and a function of capturing an image and capable of using map-data providing means on the basis of the function of detecting a position and posture, wherein the image is obtained by the movable information processing apparatus on the basis of the function of capturing an image, and the additional information is supplied from the map-data providing means on the basis of key information in the movable information processing apparatus.

3. The method of presenting information according to claim 2, wherein the movable information processing apparatus requests unavailability information related to a shooting target area of the function of capturing an image from the map-data providing means, and the shooting target area is estimated on the basis of the viewpoint information and the visual line information.

4. The method of presenting information according to claim 1, wherein the display mode includes a size of the additional information or a size of character font size to be presented in the image.

* * * * *